(12) United States Patent
Park

(10) Patent No.: US 10,080,220 B2
(45) Date of Patent: *Sep. 18, 2018

(54) METHOD AND APPARATUS OF CONTROLLING DOWNLINK HARQ TIMING

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,981

(22) Filed: Jan. 11, 2017

(65) Prior Publication Data

US 2017/0201969 A1 Jul. 13, 2017

Related U.S. Application Data

(63) Continuation of application No. 14/527,708, filed on Oct. 29, 2014, now Pat. No. 9,584,267.

(30) Foreign Application Priority Data

Nov. 1, 2013 (KR) .................. 10-2013-0132102

(51) Int. Cl.
*H04J 1/00* (2006.01)
*H04W 72/04* (2009.01)
(Continued)

(52) U.S. Cl.
CPC ......... *H04W 72/042* (2013.01); *H04L 1/1812* (2013.01); *H04L 5/0082* (2013.01);
(Continued)

(58) Field of Classification Search
CPC ..... H04L 1/1861; H04L 1/1812; H04L 5/001; H04L 5/14; H04L 5/0055; H04J 1/00;
(Continued)

(56) References Cited

U.S. PATENT DOCUMENTS 9,276,691 B2    3/2016  Choi
9,584,267 B2 *  2/2017  Park ..................... H04L 1/1812
(Continued)

FOREIGN PATENT DOCUMENTS

KR    10-2013-0075620 A    7/2013
WO    WO 2012/124980 A2    9/2012

OTHER PUBLICATIONS

"3rd Generation Partnership Project; Technical Specification Group Radio Access Network; Evolved Universal Terrestrial Radio Access (E-UTRA); Physical layer procedures (Release 11)," 3GPP TS 36.213 V11.4.0, Sep. 2013, pp. 1-182, 3GPP Organizational Partners.
(Continued)

*Primary Examiner* — Hanh N Nguyen

(57) ABSTRACT

The present disclosure relates to an apparatus and method for controlling a downlink (DL) Hybrid Automatic Repeat reQuest (HARQ) timing in a system supporting a TDD-FDD joint operation and an FDD-TDD joint operation environment. A base station transmits a PDSCH and a UE transmits an HARQ response in response to the PDSCH. In the TDD-FDD joint operation, the interval between the PDSCH transmission and the HARQ response may be determined based on an FDD mode configuration when the PDSCH is transmitted through a TDD-based primary serving cell.

14 Claims, 13 Drawing Sheets

(51) Int. Cl.
  H04L 1/18    (2006.01)
  H04W 76/04   (2009.01)
  H04L 5/00    (2006.01)
  H04L 5/14    (2006.01)
  H04W 76/27   (2018.01)

(52) U.S. Cl.
  CPC ............. *H04L 5/14* (2013.01); *H04W 76/046* (2013.01); *H04W 76/27* (2018.02); *H04W 72/0453* (2013.01)

(58) Field of Classification Search
  CPC . H04J 11/00; H04W 76/046; H04W 72/0453; H04W 72/042; H04W 52/04; H04W 72/0446
  See application file for complete search history.

(56) References Cited

U.S. PATENT DOCUMENTS

| | | | |
|---|---|---|---|
| 2015/0117275 A1* | 4/2015 | Park | H04L 1/1812 370/280 |
| 2015/0124670 A1 | 5/2015 | Park | |
| 2015/0146588 A1 | 5/2015 | Park | |
| 2015/0195062 A1 | 7/2015 | Hwang | |
| 2015/0215079 A1 | 7/2015 | Park | |
| 2015/0271758 A1 | 9/2015 | Park | |

OTHER PUBLICATIONS

"3rd Generation Partnership Project; Technical Specification Group Radio Access Network; Evolved Universal Terrestrial Radio Access (E-UTRA); Multiplexing and channel coding (Release 11)," 3GPP TS 36.212 V11.3.0, Jun. 2013, pp. 1-84, 3GPP Organizational Partners.

"Design of HARQ and Scheduling Timing Linking to Support inter-band CA with Different TDD Configurations", 3GPP TSG RN WG1 #68, Feb. 6-10, 2012, pp. 1-5, R1-120336, Research in Motion, UK Limited, Dresden, Germany.

"CA-based aspects for FDD-TDD joint operation", 3GPP TSG RAN WG1 #74, Aug. 19-23, 2013, pp. 1-4, R1-133372, LG Electronics, Barcelona, Spain.

"HARQ and scheduling timing for eIMTA", 3GPP TSG RAN WG1 #74, Aug. 19-23, 2013, pp. 1-6, R1-133418, Ericsson, ST-Ericsson, Barcelona, Spain.

International Search Report for International Patent Application No. PCT/KR2014/010265, dated Jan. 20, 2015.

Written Opinion for International Patent Application No. PCT/KR2014/010265, dated Jan. 20, 2015.

* cited by examiner (a) CA of TDD & FDD (b) CA of TDD & FDD DL (c) CA of TDD DL & FDD

FIG. 11

METHOD AND APPARATUS OF CONTROLLING DOWNLINK HARQ TIMING

CROSS-REFERENCE TO RELATED APPLICATIONS

This application is a continuation of U.S. application Ser. No. 14/527,708, filed on Oct. 29, 2014, which claims priority from and the benefit of Korean Patent Application No. 10-2013-0132102, filed on Nov. 1, 2013, each of which is hereby incorporated by reference in its entirety.

BACKGROUND

1. Field

The present invention relates to a wireless communication and, more particularly, to a method and apparatus for controlling downlink (DL) scheduling and Hybrid Automatic Repeat Request (HARQ) timing capable of being supported in a Time Division Duplex (TDD)-Frequency Division Duplex (FDD) joint operation.

2. Discussion of the Background

Automatic repeat request (ARQ) is one of the schemes that enhance reliability of a wireless communication. The ARQ refers to a scheme in which a transmitter retransmits a data signal if a data signal reception is failed at a receiver. Further, there is a scheme, hybrid automatic repeat request (HARQ), which is a combination of Forward Error Correction (FEC) and ARQ. A receiver that utilizes HARQ generally attempts an error correction for a received data signal and determines whether a retransmission needs to be performed by using an error detection code. As the error detection code, Cyclic Redundancy Check (CRC) scheme may be used. If data signal error is not detected from the detection process of CRC scheme, the receiver determines that a decoding process for the data signal is successful. In this case, the receiver transmits an Acknowledgement (ACK) signal to a transmitter. If data signal error is detected from the detection process of CRC scheme, the receiver determines that a decoding process for the data signal is not successful. In this case, the receiver transmits a Not-Acknowledgement (NACK) signal to a transmitter. If the transmitter receives the NACK signal, the transmitter may retransmit the data signal.

A wireless communication system may support Frequency Division Duplex (FDD) scheme and Time Division Duplex (TDD) scheme. In the FDD scheme, an uplink transmission and a downlink transmission may be simultaneously performed in a cell because a carrier frequency for an uplink (UL) transmission is different from a carrier frequency for a downlink (DL) transmission exists. In the TDD scheme, with respect to one cell, an uplink transmission and a downlink transmission are distinguished from each other based on different time slots. In the TDD scheme, a base station and a user equipment perform switching operations between a transmission mode and a reception mode because the same carrier is used for both an uplink transmission and a downlink transmission. In the TDD scheme, a Special Subframe may be added to provide a guard time for switching between the transmission mode and the reception mode. The Special Subframe may include Downlink Pilot Time Slot (DwPTS), Guard Period (GP), and Uplink Pilot Time Slot (UpPTS). According to the TDD scheme, resource amounts for the uplink transmission and resource amounts for the downlink transmission may be asymmetrically assigned through various uplink (UL)-downlink (DL) configurations.

Currently, remaining frequency resources are scarce and various technologies have been utilized in wide frequency bands because of the frequency resource scarcity. For this reason, in order to provide a wideband bandwidth for supporting higher data-rate requirements, each of scattered bands has been configured to satisfy basic requirements to operate an independent system and a carrier aggregation (CA) scheme, which aggregates various frequency bands into one system, has been adopted. Here, each frequency band or carrier capable of an independent operation may be defined as a component carrier (CC). According to the adoption of the carrier aggregation system, ACK/NACK signals corresponding to a plurality of component carriers (CCs) need to be transmitted.

Recently, there is a need for a TDD-FDD joint operation scheme that supports a CA and/or a dual connectivity of an FDD band (or carrier) or a TDD band (or carrier). However, the standard only defines DL HARQ timing in relation to a FDD CA joint operation or a TDD CA joint operation, and it does not define the DL HARQ timing for the TDD-FDD joint operation. Therefore, there is a need for a method for configuring or controlling a new HARQ timing for the TDD-FDD joint operation.

SUMMARY

In accordance with an aspect of the present invention, an object is to provide a method and apparatus for a DL scheduling.

In accordance with an aspect of the present invention, an object is to provide a method and apparatus for a DL HARQ timing for a UE in which a TDD-FDD joint operation is configured.

In accordance with an aspect of the present invention, another object is to provide a method and apparatus for a DL HARQ in a system that supports a carrier aggregation (CA) or a dual connectivity.

According to an exemplary embodiment of the present invention, there is provided a base station that supports DL HARQ in a wireless communication system which supports a CA of a TDD based first serving cell and a FDD based second serving cell. The based station includes an base station transmitter which transmits a TDD-FDD CA configuration information for a CA of a first serving cell and a second serving cell to a UE and also transmits a transport block of a DL subframe from the second serving cell to a UE based on the TDD-FDD CA configuration information, a HARQ processor which creates an ACK/NACK signal for the transport block and determines a DL HAQR timing for the second serving cell, which is also the ACK/NACL signal transmission timing for the transport block, based on the TDD-FDD CA configuration information, and a base station receiver which receives the ACK/BACK signal from the UE in the above first serving cell based the DL HARQ timing for the second serving cell.

According to an exemplary embodiment of the present invention, there is provided a method for supporting a DL HARQ by a UE in a wireless communication system that supports a TDD based first serving cell and a FDD based second serving cell. The method includes receiving a TDD-FDD CA configuration information for a CA of a first serving cell and a second serving cell from a base station, receiving a transport block in a DL subframe in the second serving cell from the base station based on the TDD-FDD CA configuration information, creating a ACK/NACK signal regarding the transport block, determining a DL HARQ timing for the second serving cell, which is also the ACK/

NACK signal transmission timing, based on the TDD-FDD CA configuration information, and transmitting the ACK/NACK signal in the first serving cell to the base station based on the DL HARQ timing.

According to aspects of the present invention, a DL HARQ timing may be efficiently controlled in relation to the secondary serving cell for a UE in which a TDD-FDD carrier aggregation (or a dual connectivity) is configured, and a data transmission rate may be enhanced by increasing a the number of DL resource utilization rate.

BRIEF DESCRIPTION OF THE DRAWINGS

FIG. 11 is a diagram illustrating example of a DL HARQ timing in a TDD-FDD CA configured UE.

DETAILED DESCRIPTION OF THE ILLUSTRATED EMBODIMENTS

Figure 1:
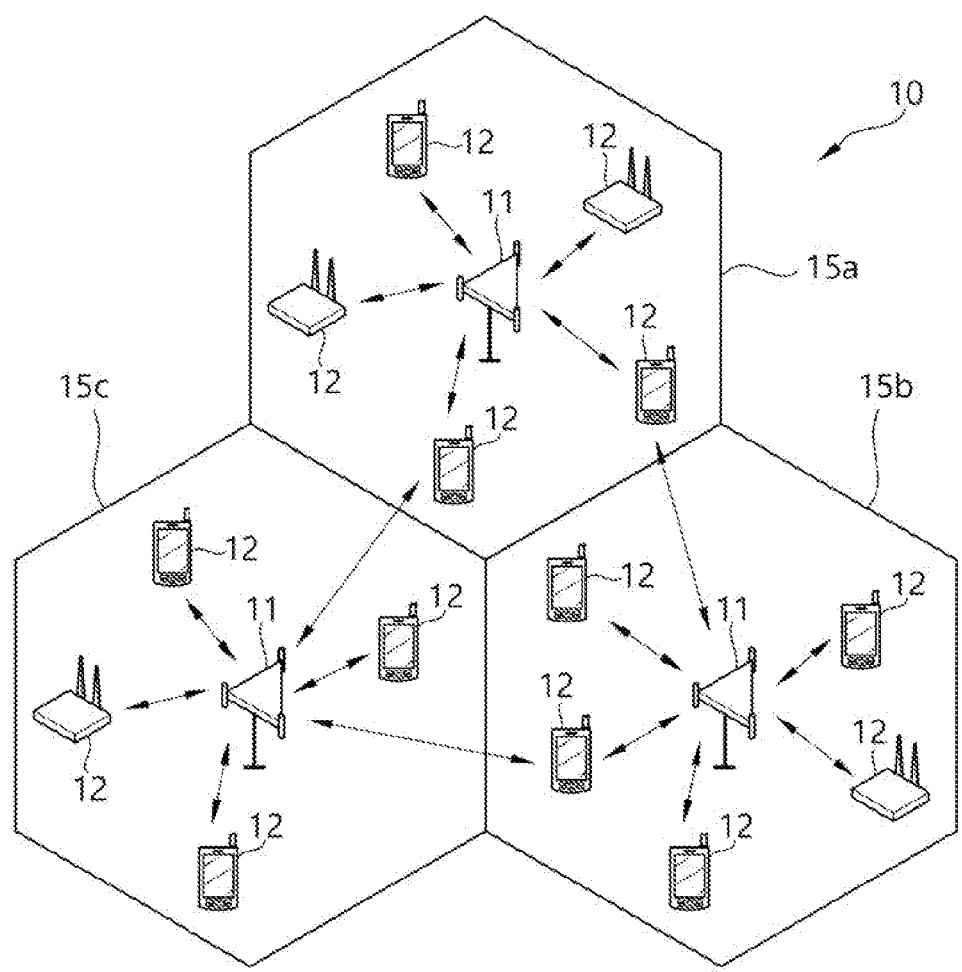
FIG. 1 is a diagram illustrating a wireless communication system according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

FIG. 1 is a diagram illustrating a wireless communication system according to an exemplary embodiment of the present invention.

According to FIG. 1, a wireless communication system 10 is widely deployed in order to provide diverse telecommunication services, such as voice and packet data. A wireless communication system includes at least one base station 11 (BS). Each BS 11 provides telecommunication service to certain cells 15a, 15b, and 15c. A cell may again be divided into multiple sectors.

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A base station 11 may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

Carrier Aggregation (CA), which is also referred to as spectrum aggregation or bandwidth aggregation, supports multiple carriers. Each individual unit carrier, which is aggregated by carrier aggregation, is referred to as Component Carrier (CC). Each component carrier is defined by bandwidth and center frequency. CA is introduced to support increasing throughput, to prevent cost increase due to the introduction of the wideband radio frequency and to ensure the compatibility with the existing system. For example, if five component carriers are allocated as granularity that has a carrier unit with 20 MHz bandwidth, it can support 100 MHz bandwidth at maximum.

CA may be divided as contiguous carrier aggregation, which is made among continuous CCs, and non-contiguous carrier aggregation, which is made among non-continuous CCs. The number of carriers aggregated between uplink and downlink may be configured differently. It is referred to as symmetric aggregation when there are equal number of downlink CCs and uplink CCs, and it is referred to as asymmetric aggregation when the number of downlink CCs and the number of uplink CCs are not equal.

The size of component carriers (in other words, bandwidth) may be different. For example, if five component carriers are used to form 70 MHz band, 5 MHz component carrier (carrier #0)+20 MHz component carrier (carrier #1)+20 MHz component carrier (carrier #2)+20 MHz component carrier (carrier #3)+5 MHz component carrier (carrier #4) may be aggregated together.

Hereinafter, a multiple carrier system includes the system that supports carrier aggregation. Contiguous CA and/or non-contiguous CA may be used in the multiple carrier system; in addition, both symmetric aggregation and asymmetric aggregation may be used in the multiple carrier system as well. A serving cell may be defined as a component frequency band based on multiple CC system which may be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell may be used together with a PCell to form an aggregation of serving cells, the cell used with a PCell is referred to as an SCell. An aggregation of serving cells which configured for a user equipment may include one PCell, or one PCell together with at least one SCell.

Downlink component carrier corresponding to a PCell refers to Downlink (DL) Primary Component Carrier (PCC), and uplink component carrier corresponding to a PCell refers to Uplink (UL) PCC. In addition, downlink component carrier corresponding to an SCell refers to a DL Secondary Component Carrier (SCC), and an uplink component carrier corresponding to an SCell refers to a UL SCC. Only DL CC or UL CC may correspond to a serving cell, or a DL CC and an UL CC together may correspond to a serving cell.

Figure 2:
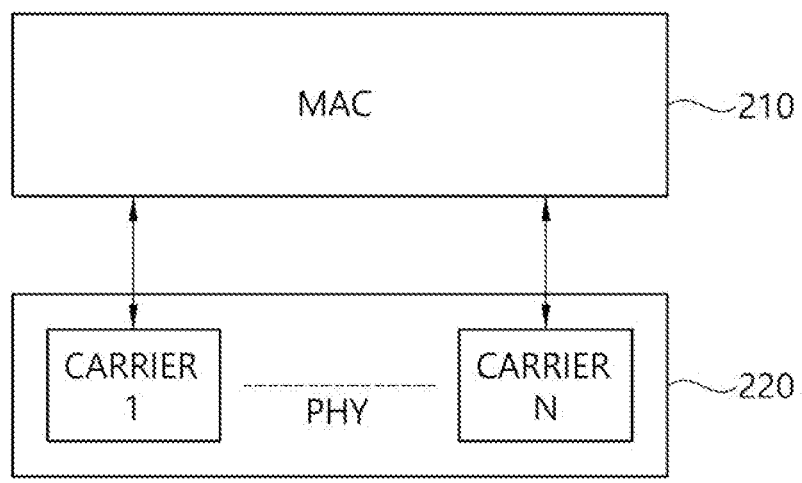
FIG. 2 is a diagram illustrating an example of a protocol structure for supporting a multi-carrier system according to an exemplary embodiment of the present invention.

FIG. 2 is a diagram illustrating an example of a protocol structure for supporting a multi-carrier system according to an exemplary embodiment of the present invention.

Referring to FIG. 2, common Medium Access Control (MAC) entity 210 manages physical layer 220 which uses a plurality of carriers. The MAC management message, transmitting through a certain carrier, may be applied to other carriers. That is, the MAC management message is a message which controls other carriers including the certain carrier mentioned above. A physical layer 220 may be operated by the Time Division Duplex (TDD) and/or the Frequency Division Duplex (FDD).

There are some physical control channels used in physical layer 220. As a DL physical channel, a Physical Downlink Control Channel (PDCCH) informs to a UE with regard to resource allocation of a Paging Channel (PCH) and a Downlink Shared Channel (DL-SCH), and a Hybrid Automatic Repeat Request (HARQ) information related to a DL-SCH. The PDCCH may carry uplink grant which informs a resource allocation of uplink transmission to a UE. The DL-SCH is mapping to a Physical Downlink Shared Channel (PDSCH). A Physical Control Format Indicator Channel (PCFICH), which transmits every sub-frame, informs the number of OFDM symbols used on the PDCCHs to a user equipment. A Physical Hybrid ARQ Indicator Cannel (PHICH), as a DL channel, carries the HARQ ACK/NACK signals as a response to uplink transmission. As a UL physical channel, Physical Uplink Control Channel (PUCCH) may carry UL controlling information such as ACK (Acknowledgement)/NACK (Non-acknowledgement) or Channel Status Information (CSI) which includes Channel Quality Indicator (CQI), Precoding Matrix Index (PMI), Precoding Type Indicator (PTI) or Rank Indication (RI). The Physical Uplink Shared Channel (PUSCH) carries the Uplink Shared Channel (UL-SCH). The Physical Random Access Channel (PRACH) carries random access preamble.

A plurality of the PDCCH may be transmitted in the controlled region, and a user equipment can monitor a plurality of the PDCCH. The PDCCH is transmitted on either one Control Channel Element (CCE) or an aggregation of several consecutive CCEs. The CCE is a logical allocation unit used to provide PDCCH with a code rate based on the state of radio channel. The CCE corresponds to a plurality of Resource Element Groups. The format of the PDCCH and the number of available bits for the PDCCH are determined according to the relationship between the number of CCEs and a code rate provided by the CCEs.

Control information carried on the PDCCH is referred to as Downlink Control Information (DCI). The following table 1 shows DCI pursuant to several formats.

TABLE 1

| DCI Format | Description |
| --- | --- |
| 0 | Used for PUSCH scheduling in uplink cell |
| 1 | Used for one PDSCH codeword scheduling in one cell |
| 1A | Used for brief scheduling of one PDSCH codeword in one cell or random access process initialized by the PDCCH command |
| 1B | Used for a brief scheduling of one PDSCH codeword with precoding information in one cell |
| 1C | Used for one PDSCH codeword brief scheduling in one cell or the notification of MCCH change |
| 1D | Used for a brief scheduling of one PDSCH codeword in one cell including precoding or power offset information |
| 2 | Used for the PDSCH scheduling of the user equipment configured of spartial multiplexing mode. |
| 2A | Used for the PDSCH scheduling of the user equipment configured of large delay CDD mode |

TABLE 1-continued

| DCI Format | Description |
|---|---|
| 2B | Used in the transmission mode 8 (a double layer transmission, etc) |
| 2C | Used in the transmission mode 9 (a multi layer transmission) |
| 2D | Used in the transmission mode 10 (CoMP) |
| 3 | Used for the tramission of TPC commands for PUCCH and PUSCH including 2-bit power adjustment |
| 3A | Used for the tramission of TPC commands for PUCCH and PUSCH including single-bit power adjustment |
| 4 | Used for the PUSCH scheduling in the uplink multi-antenna port transmission cell |

Referring to Table 1, There are DCI formats such as format 0 used for the PUSCH scheduling in uplink cell, format 1 used for one PDSCH codeword scheduling in one cell, format 1A used for compact scheduling of one PDSCH codeword, format 2 used for the PDSCH scheduling in closed-loop spartial multiplexing mode, format 2B used for the PDSCH scheduling in open-loop spartial multiplexing mode, format 2B used in the transmission mode 8, format 2C used in the transmission mode 9, format 2D used in the transmission mode 10, format 3 and 3A used for the uplink transmission of TPC commands for the PUCCH and the PUSCH, and format 4 used for the PUSCH scheduling in the uplink multi-antenna port transmission cell.

Each field of DCI is sequentially mapped to n number of information bits $a_0$ or $a_{n-1}$ For example, the DCI is mapped to a total length of 44 bits of information bits, each field of DCI is mapped sequentially to $a_0$ or $a_{43}$. DCI formats 0, 1A, 3, 3A may have the same payload size. DCI format 0, 4 may be referred to as the Uplink grant (UL grant).

Cross-carrier scheduling is a scheduling method capable of performing resource allocation of a PDSCH transmitted by using a different carrier through a PDCCH transmitted through a specific CC and/or resource allocation of a PUSCH transmitted by using another CC other than a CC basically linked to the specific CC. That is, the PDCCH and the PDSCH may be transmitted through different DL CCs, and the PUSCH may be transmitted through a UL CC other than a UL CC linked to a DL CC on which a PDCCH including a UL grant is transmitted.

During cross-carrier scheduling, a user equipment only receives scheduling information (such as UL grant) through a serving cell (or CC). Hereinafter, a serving cell (or CC) performing cross-carrier scheduling may refer to scheduling cell (or CC), and a serving cell being scheduled by scheduling cell may refer to scheduled cell (or CC). Scheduling cell may refer to ordering cell, and scheduled cell may refer to following serving cell. For example, a scheduled cell may be scheduled by a scheduling cell. Scheduling information for the scheduled cell may be received through the scheduling cell.

As such, in a system supporting the cross-carrier scheduling, a carrier indicator is necessary to report which DL CC/UL CC was used to transmit the PDCCH/EPDCCH which indicates the PDSCH/PUSCH transmission. A field including the carrier indicator is hereinafter called a carrier indication field (CIF). Hereinafter, configuration of CIF may mean that configuration of cross-carrier scheduling.

The aforementioned cross-carrier scheduling may be classified into the DL cross-carrier scheduling and UL cross-carrier scheduling. The DL cross-carrier scheduling implies a case where the CC for transmitting the PDCCH/EPDCCH including resource allocation information for the PDSCH transmission and other information is different from a CC for transmitting the PDSCH. The UL cross-carrier scheduling implies a case where a CC for transmitting the PDCCH/EPDCCH including a UL grant for the PUSCH transmission is different from the DL CC linked to the UL CC for transmitting the PUSCH.

Figure 3:
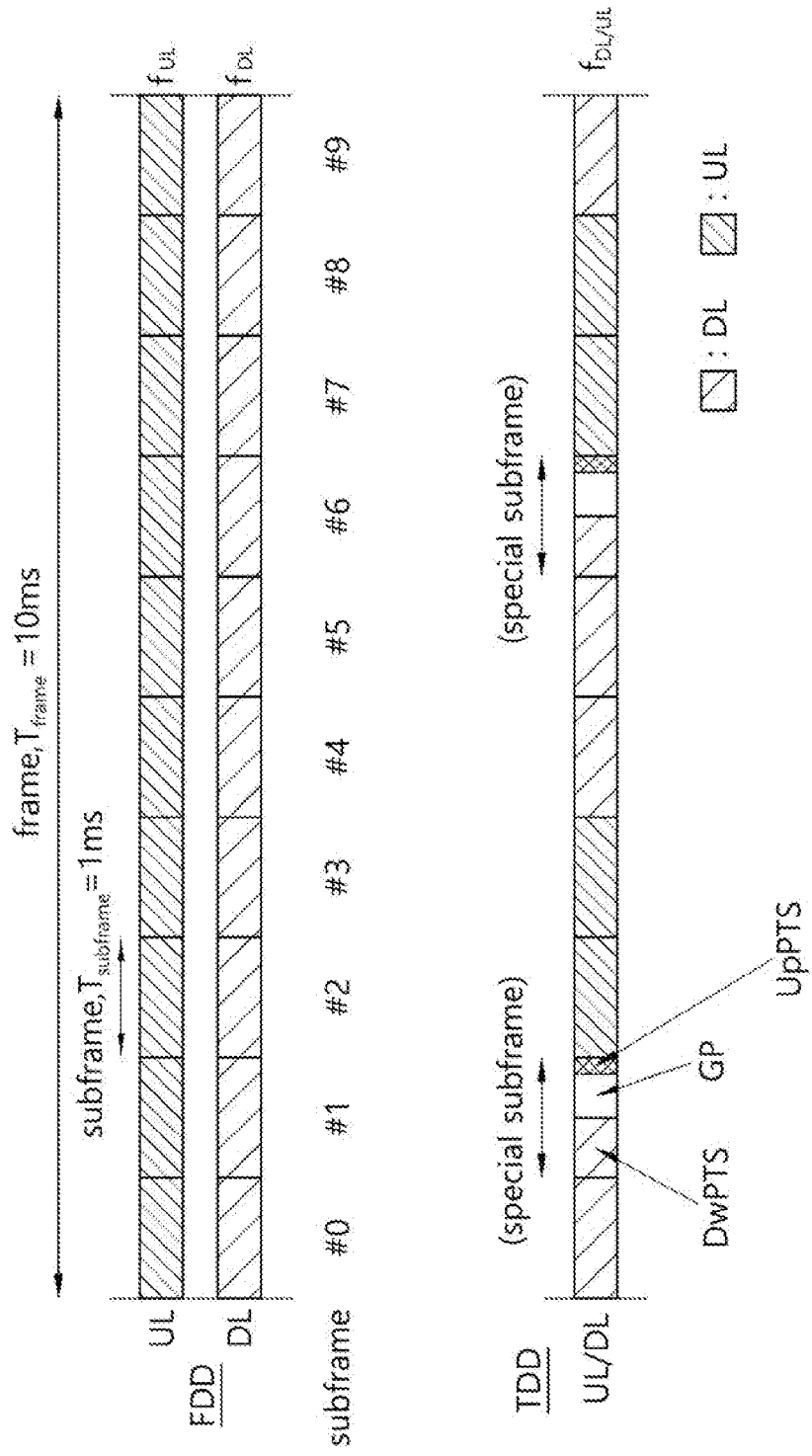
FIG. 3 is a diagram illustrating an example of a radio frame structure according to an exemplary embodiment of the present invention. The diagram illustrates a FDD radio frame structure and a TDD radio frame structure.

FIG. 3 is a diagram illustrating an example of a radio frame structure according to an exemplary embodiment of the present invention. The diagram illustrates a FDD radio frame structure and a TDD radio frame structure.

Referring to FIG. 3, one radio frame includes 10 subframes, and one subframe includes 2 consecutive slots.

In the FDD, both carrier used for UL transmission and carrier used for DL transmission exist, and UL transmission and DL transmission may be performed simultaneously in one cell.

In the TDD, on one cell basis, UL transmission and DL transmission can always distinguished in time. Because a same carrier is used for both UL transmission and DL transmission, a base station and user equipment repeatedly switches between the transmission mode and the reception mode. In the TDD, special subframe may be placed to provide a guard time which is for switching mode between the transmission and the reception. Special subframe, as shown, includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is needed to avoid interference between an uplink and a downlink, and during the GP, no UL transmission and DL transmission occurs.

Table 2 shows an example of UL/DL configuration of radio frame. UL/DL configuration defines reserved subframe for UL transmission or reserved subframe for DL transmission. That is, UL/DL configuration informs the rules how the uplink and the downlink are allocated (or reserved) in every subframe of one radio frame.

TABLE 2

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, 'D' denotes a DL subframe, 'U' denotes a UL subframe, and 'S' denotes a special subframe. As shown to Table 2, subframe 0 and 5 are always allocated to DL transmission, and subframe 2 is always allocated to ULtransmission. As shown to Table 2, each UL-DL configuration has a different number and position of DL subframe and UL subframe in one radio frame. Through diverse UL-DL configuration, the amount of resource allocated to UL/DL transmission may be given asymmetrically. To avoid severe interference between UL and DL among cells, neighboring cells generally have same UL-DL configuration.

The point changing from DL to UL or the point changing from UL to DL is referred to as the switching point. The switch-point periodicity, which is either 5 ms or 10 ms, means a repeating period of the same changing aspect between the UL subframe and DL subframe. For example, referring to the UL/DL configuration 0, subframe from 0 to 4 changes D→S→U→U→U, subframe from 5 to 9 changes, as same as before, D→S→U→U→U. Since one subframe is 1 ms, the switch-point periodicity is 5 ms. That is, the switch-point periodicity is shorter than the length of one radio frame (10 ms), the changing aspect in the radio frame is repeated for one time.

The UL-DL configuration in above Table 2 may be transmitted from a base station to a user equipment through system information. The base station may inform a UL/DL allocation status change in a radio frame to a UE by transmitting the index of the UL/DL configuration whenever the UL/DL configuration changes. Or the UL/DL configuration may be control information which is transmitted to every UE in the cell through broadcast channel.

Meanwhile, the Automatic Repeat Request (ARQ) is one of the schemes that enhance reliability of a wireless communication. The ARQ refers to a scheme in which a transmitter retransmits a data signal if a data signal reception is failed at a receiver. Further, there is a scheme, the hybrid automatic repeat request (HARQ), which is a combination of the Forward Error Correction (FEC) and the ARQ. A receiver that utilizes the HARQ generally attempts an error correction for a received data signal and determines whether a retransmission needs to be performed by using an error detection code. As the error detection code, Cyclic Redundancy Check (CRC) scheme may be used. If data signal error is not detected from the detection process of CRC scheme, the receiver determines that a decoding process for the data signal is successful. In this case, the receiver transmits an Acknowledgement (ACK) signal to a transmitter. If data signal error is detected from the detection process of CRC scheme, the receiver determines that a decoding process for the data signal is not successful. In this case, the receiver transmits a Not-Acknowledgement (NACK) signal to a transmitter. If the transmitter receives the NACK signal, the transmitter may retransmit the data signal.

The DL HARQ is a procedure where a based station transmits the DL grant, which is a PDSCH scheduling information, through the PDCCH/EPDCCH to UE, and after transmitting the PDSCH, the UE transmits the HARQ ACK/NACK regarding the DL-SCH transport block which is included in the PDSCH through PUCCH at a predetermined timing until when the base station receives the HARQ ACK signal from the UE.

For the FDD, the UE transmits the HARQ response in the subframe n, when a PDSCH transmission for the UE is detected in subframe n−4. There are three subframes, a subframe n−3, a subframe n−2, and a subframe n−1, between the subframe n−4 and the subframe n. However, the subframe n−k does not necessarily have lower subframe number than the subframe n−k+1. For example, if a radio frame has total 10 subframes and n=2, the subframe n is a subframe 2 of a radio frame j, the subframe n−1 is a subframe 1 of a radio frame j, the subframe n−2 is a subframe 0 of a radio frame j, the subframe n−3 is a subframe 9 of a radio frame j−1, and the subframe n−4 is a subframe 8 of a radio frame j−1. The radio frame j−1 is a radio frame prior to the radio frame j and adjacent to the radio frame j.

For the TDD, if there is the PDSCH transmission by the detection of the PDCCH/EPDCCH in the subframe n−k or if there is the PDCCH/EPDCCH which indicates the releasing of the Semi-Persistent Scheduling (SPS), the UE transmits the HARQ response in the subframe n. In this case, the DL HARQ ACK/NACK transmission timing may be shown as Table 3 below. Table 3 indicates downlink association set index $K:=\{k_0, k_1, \ldots, K_{M-1}\}$ for TDD.

TABLE 3

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 3, n is a subframe number (or "subframe index"), a DL subframe set associated with the subframe n is determined by $K=\{k_0, k_1, \ldots, K_{M-1}\}$, and $n-k_i$ is a subframe index of subframe $n-k_i$ which indicates the DL subframe associated with the current subframe, the subframe n. The number of subframes located between the subframe $n-k_i$ and the subframe n is $k_i-1$. Here, $k_i=k_0, k_1, \ldots, K_{M-1}$. The associated DL subframe means a subframe carrying a PDSCH as a basis of ACK/NACK signal decision. M is the number of elements in set K as defined in Table 3 which shows the number of DL subframe associated with $n^{th}$ subframe. M is the number of elements in the set K. If a PDSCH transmitted in the subframe $n-k_i$ is received by a UE, the UE transmits an HARQ ACK/NACK associated with the PDSCH in the subframe n as a response. Thus, the interval between the subframe $n-k_1$ and the subframe n is determined by the index $k_1$.

For example, when the UL/DL configuration for one serving cell is 1, M=2 and $k_0$=7, $k_1$=6 for the DL associated set K for a subframe 2. Thus, the DL subframe associated with the subframe 2 in the serving cell is $5^{th}(2-k_0)$ and $6^{th}(2-k_1)$ subframe of the prior radio frame. Specifically, each radio frame has 10 subframes from subframe 0 to subframe 9, and the subframe 0 of a radio frame is located next to the subframe 9 of the prior radio frame.

Figure 4:
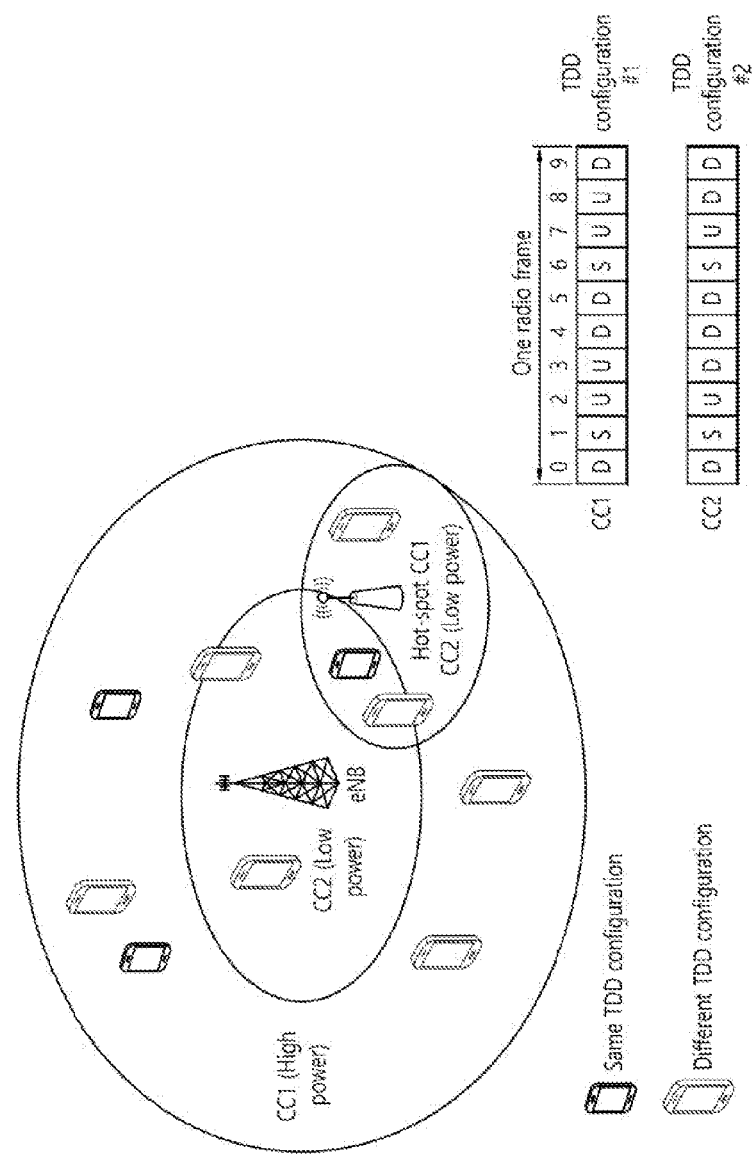
FIG. 4 is a diagram illustrating an example of an inter-band CA of serving cells with different TDD UL-DL configurations.

FIG. 4 is a diagram illustrating an example of an inter-band CA of serving cells with different TDD UL-DL configurations.

Referring to FIG. 4, when referring the CCs configuring a UE and a CA as CC1 and CC2, CC1 may be configured to a UL/DL configuration #1 and CC2 may be configured to a UL/DL configuration #2 for the purpose of traffic adaptation and interference coordination among inter-RATs. For example, a different UL/DL configuration in the inter-band CA may be necessary to avoid the intervention issues of the different TDD system (ex. TDS-CDMA, WiMAX, etc) which co-exists in the same band. Also, if a UL/DL configuration with many UL subframe is applied to low frequency band, and if a UL/DL configuration with many DL subframe is applied to high frequency band, it may be helpful to the coverage enhancement.

For the TDD, when a UE is configured with more than one serving cell, and at least two serving cells have different UL/DL configurations, and the serving cell is a primary cell (PCell), the UL/DL configuration of the PCell is a DL-reference UL/DL configuration for the PCell. Here, the DL-reference UL/DL configuration means the UL/DL configuration as a basis for a DL HARQ timing of the serving cell.

Meanwhile, for the TDD, when a UE is configured with two or more serving cells, and at least two serving cells have different UL/DL configurations, and the serving cell is a secondary cell (SCell), a DL-reference UL/DL configuration for the SCell may be shown as Table 4 below.

TABLE 4

| Set # | (Primary cell UL/DL configuration, Secondary cell UL/DL configuration) | DL-reference UL/DL configuration |
|---|---|---|
| Set 1 | (0,0) | 0 |
|  | (1,0), (1,1), (1,6) | 1 |
|  | (2,0), (2,2), (2,1), (2,6) | 2 |
|  | (3,0), (3,3), (3,6) | 3 |
|  | (4,0), (4,1), (4,3), (4,4), (4,6) | 4 |
|  | (5,0), (5,1), (5,2), (5,3), (5,4), (5,5), (5,6) | 5 |
|  | (6,0), (6,6) | 6 |
| Set 2 | (0,1), (6,1) | 1 |
|  | (0,2), (1,2), (6,2) | 2 |
|  | (0,3), (6,3) | 3 |
|  | (0,4), (1,4), (3,4), (6,4) | 4 |
|  | (0,5), (1,5), (2,5), (3,5), (4,5), (6,5) | 5 |
|  | (0,6) | 6 |
| Set 3 | (3,1), (1,3) | 4 |
|  | (3,2), (4,2), (2,3), (2,4) | 5 |
| Set 4 | (0,1), (0,2), (0,3), (0,4), (0,5), (0,6) | 0 |
|  | (1,2), (1,4), (1,5) | 1 |
|  | (2,5) | 2 |
|  | (3,4), (3,5) | 3 |
|  | (4,5) | 4 |
|  | (6,1), (6,2), (6,3), (6,4), (6,5) | 6 |
| Set 5 | (1,3) | 1 |
|  | (2,3), (2,4) | 2 |
|  | (3,1), (3,2) | 3 |
|  | (4,2) | 4 |

In Table 4, based on a pair of (PCell UL/DL configuration, SCell UL/DL configuration), it indicates the DL-reference UL/DL configuration for the SCell.

For example, the DL-reference UL/DL configuration for the SCell may apply the DL HARQ timing according to the DL-reference UL/DL configuration for the Set 1, if the pair of (PCell UL/DL configuration, SCell UL/DL configuration) in Table 4 is included in Set 1. In this case, it is irrelevant to a scheduling method.

Or, when a UE is configured with a self-scheduling, if a pair of (PCell UL/DL configuration, SCell UL/DL configuration) is included in Set 2 or Set 3, it follows the DL-reference UL/DL configuration in the Set 2 or Set 3. Here, a UE is configured with a self-scheduling may mean that the UE is not configured to monitor another serving cell's PDCCH/EPDCCH for the scheduling of its serving cell.

Or, when a UE is configured with a cross-carrier scheduling, if a pair of (PCell UL/DL configuration, SCell UL/DL configuration) is included in Set 4 or Set 5, it follows the DL-reference UL/DL configuration in the Set 4 or Set 5. Here, a UE is configured with a cross-carrier scheduling may mean that the UE is configured to monitor another serving cell's PDCCH/EPDCCH for the scheduling of its serving cell.

In other words, regardless a configuration of the Carrier Indicator Field (CIF) which shows a scheduling for a certain carrier, Set 1 applies the DL-reference UL/DL configuration of the Set 1 if it satisfies the pair. However, Set 2/3 only applies to a UE without the CIF configuration, and Set 4/5 only applies to a UE with the CIF configuration.

The ACK/NACK signal regarding the PDCCH/EPDCCH which indicates the release of the PDSCH or SPS corresponding to each plurality of serving cells used to compose a CA may be transmitted at the aforementioned HARQ timing.

Meanwhile, there is a enhanced Interference Management and Traffic Adaptation (EIMTA) method for an interference control among base stations and adaptive traffic control in the TDD system. An eIMTA method supports a dynamic change in the TDD UL/DL configuration time domain based on traffics or interference circumstance. For example, a UE with eIMTA configuration may change the TDD UL/DL configuration dynamically in subframe units based a reception of PDCCH with the eIMTA-RNTI masking.

Figure 5:
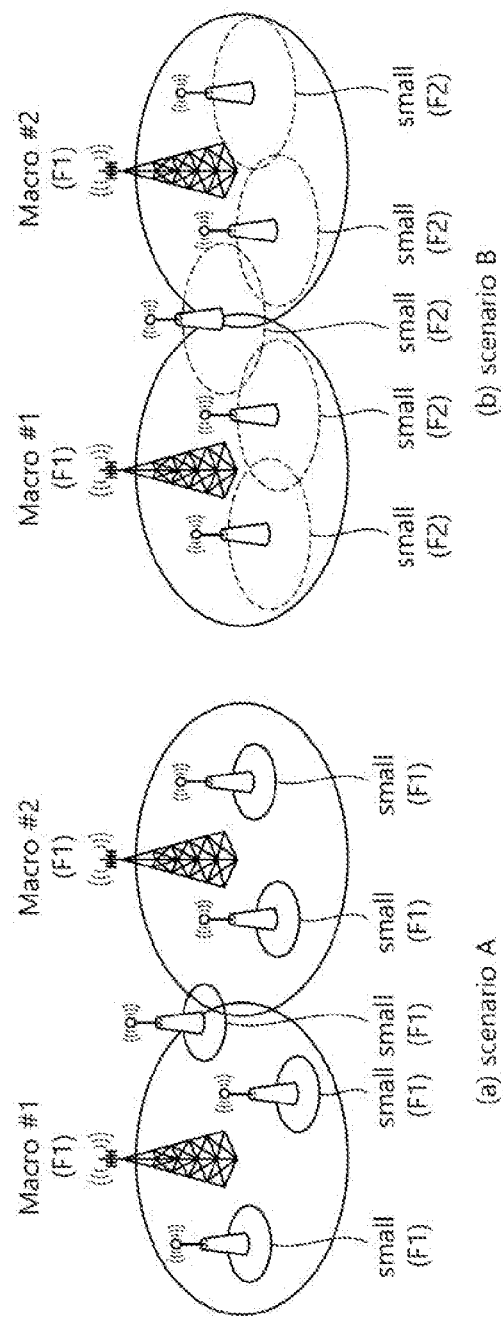
FIG. 5 is diagram illustrating an example of a deployment scenario according to an exemplary embodiment of the present invention.

FIG. 5 is diagram illustrating an example of a deployment scenario as an exemplary embodiment of the present invention.

Referring to FIG. 5, a plurality of macro cells and small cells (for example, pico cell or femto cell) may be deployed adjacent to each other with having same or adjacent frequency. (a) is a deployment scenario that a plurality of outdoor small cells are using a same frequency band with macro cells' frequency band. (b) is a deployment scenario that a plurality of small cells are using same frequency band, macro cell are using frequency band which are adjacent to the frequency band which small cells are using, and all macro cells have a same UL/DL configuration, and small cells may adjust the UL/DL configuration.

In the abovementioned scenarios, small cells (for example, pico cells or femto cells), except the macro cells, may be supported by dynamic changes of a TDD UL/DL configuration for the interference or traffic control.

If the dynamic changes of the TDD UL/DL configuration are supported, the DL HARQ reference configuration (that is, DL-reference UL/DL configuration) for the DL HARQ may be selected from the TDD UL/DL configuration {2, 4, 5}.

In this case, a UE, in a DL HARQ reference configuration, may not expect that a random subframe configured as a UL subframe or a special subframe may be dynamically used as a DL subframe.

However, recently, a TDD-FDD joint operation method, which supports a CA and/or dual connectivity of the FDD band or carrier or TDD band or carrier, is considered.

Figure 6:
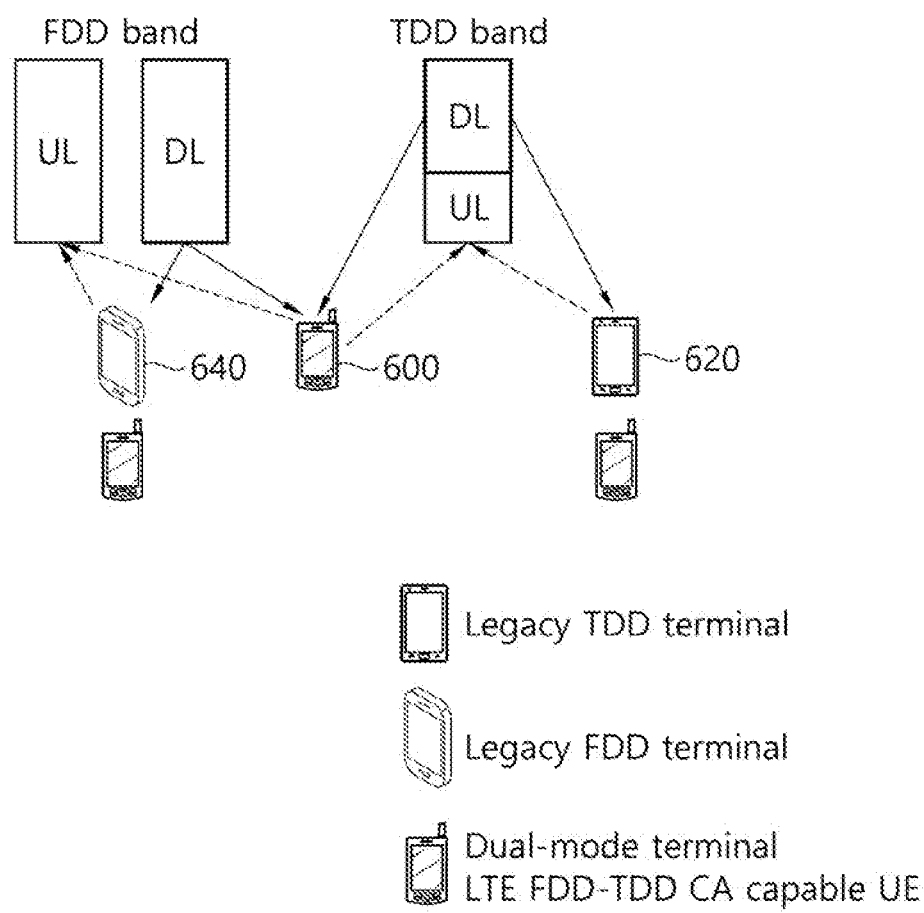
FIG. 6 is a diagram illustrating an example of an FDD-TDD joint operation method application according to an exemplary embodiment of the present invention.

FIG. 6 is a diagram illustrating an example of an FDD-TDD CA method application according to an exemplary embodiment of the present invention.

Referring FIG. 6, in case of the TDD legacy UE 620, wireless communication service can only be received through the TDD band, and in case of the legacy FDD UE 640, wireless communication service can only be received through the FDD band. On other hands, in case of the FDD-TDD CA capable UE 600, wireless communication service may be received through the FDD and the TDD bands, and also the CA based wireless communication service is provided through the TDD band carrier and the FDD band carrier.

For those aforementioned TDD-FDD CA, for example, the following deployments may be considered.

As an example, the FDD base station and the TDD base station is co-located (for example, CA scenarios 1 through 3), or the FDD base station and the TDD based station is not co-located, but connected through the ideal backhaul (for example, CA scenario 4).

As another example, the FDD base station and the TDD base station is not co-located, and connected through non-ideal backhaul (for example, small cell scenario 2a, 2b, and macro-macro scenario).

However, for the TDD-FDD CA, it is desirable that the TDD base station and the FDD base station is connected through the ideal backhaul and the TDD cell and the FDD cell is operated as synchronized.

In addition, for the TDD-FDD CA, following prerequisite may be considered.

First, a UE supporting the FDD-TDD CA may access to the legacy FDD single mode carrier and the legacy TDD single mode carrier.

Second, the legacy FDD UEs and the UEs supporting the TDD-FDD CA may camp on and be connected to the FDD carrier which is the part of the aforementioned FDD/TDD network.

Third, the legacy TDD UEs and the UEs supporting the TDD-FDD CA may camp on and be connected to the TDD carrier which is the part of the aforementioned FDD/TDD joint operation network.

Fourth, a network architecture enhancement in order to facilitate the FDD-TDD CA, for example, with regard to the non-ideal backhaul, may be considered. However, keeping the minimal network architecture changes should be considered since it is still essential in operator's perspective.

In addition, as a UE to support the TDD-FDD CA, following UE abilities may be considered.

Figure 7:
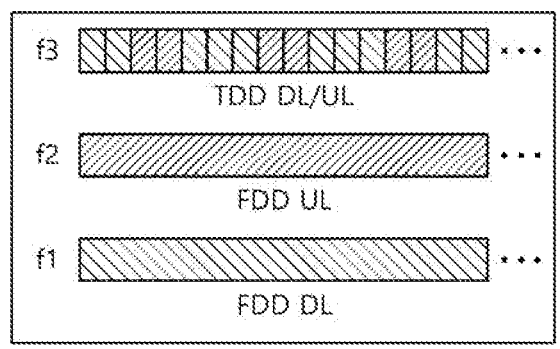
FIG. 7 is a diagram illustrating examples of user equipment capabilities for a TDD-FDD joint operation according to an exemplary embodiment of the present invention.
Figure 7:
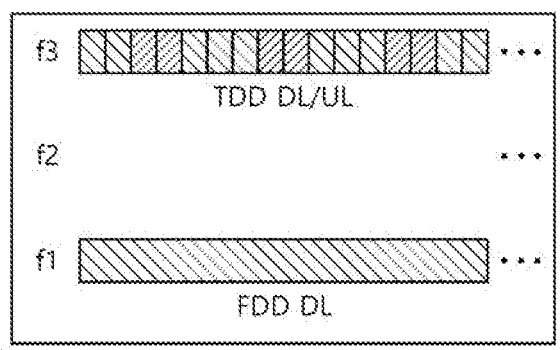
Figure 7:
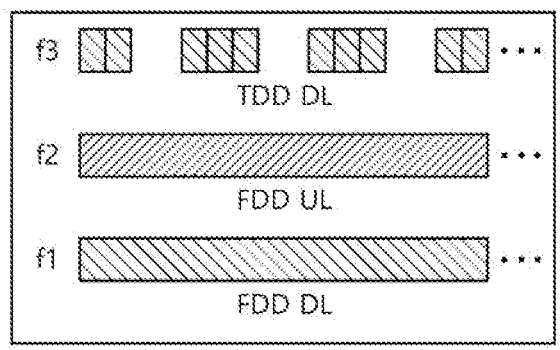

FIG. 7 is examples of UE capabilities for the TDD-FDD CA according to an exemplary embodiment of the present invention.

Referring to FIG. 7, (a) indicates that a UE is supporting the CA between the TDD carrier and the FDD carrier; (b) indicates that a UE is supporting the CA between the TDD carrier and the FDD DL carrier; and (c) indicates that a UE is supporting the CA between the TDD carrier with a DL subframe and the FDD carrier.

As mentioned above, a UE may support different types of the TDD-FDD CA, and further, it may perform simultaneous reception (that is, DL aggregation) from the FDD and TDD carriers. Secondly, a UE may perform simultaneous transmission (that is, UL aggregation) from the FDD and TDD carriers, and thirdly, a UE may perform simultaneous transmission and reception (that is, full duplex) from the FDD and TDD carriers.

As to the TDD-FDD CA, for example, the number of maximum supported CCs may be 5. Also, a CA with different UL/DL configurations may be supported for TDD carriers in different bands.

In that case, a UE capable with the FDD-TDD CA may support the TDD-FDD DL CA, and may not support the TDD-FDD UL CA. A UE capable with the FDD-TDD CA may, at least, support the TDD-FDD DL CA, but the UE may or may not support the TDD-FDD UL CA.

Meanwhile, a UE may configure a dual connectivity through two or more base stations among base stations that may include at least one serving cell. A dual connectivity is an operation that the UE utilizes wireless resources provided by at least two different network points (for example, a macro base station or a small base station) in RRC_CONNECTED mode. In this case, those abovementioned two different network points may be connected by a non-ideal backhaul. Here, one of those abovementioned two different network points may refer to a macro base station (or a master base station or an anchor base station), remaining network points may refer to small base stations (or secondary base stations or assisting base stations, or slave base stations).

A UE, as mentioned above, may support a TDD-FDD joint operation when the CA and/or dual connectivity is configured to the UE. Hereinafter, aspects of the present invention will be explained based on a case where a UE configured to the CA, but aspects of the present invention may be applied to a case of a UE configured to the dual connectivity.

The DL HARQ method supports a CA among carriers with either same or different UL/DL configuration and a CA among FDD carriers, but DL HARQ for the abovementioned TDD-FDD CA is not specified. Hereinafter, an exemplary embodiment suggests a method that operates a DL HARQ when a UE is configured with the TDD-FDD CA (or dual connectivity). More specifically, it suggests the DL HARQ timing which the ACK/NACK signal is transmitted responsive to the PDCCH/EPDCCH transmission. Here, the PDCCH/EPDCCH transmission may indicate the PDSCHs for one or more aggregated serving cell. Further, the PDCCH/EPDCCH may indicate the release of SPS corresponding to each serving cell.

When a TDD-FDD CA is configured, the PUCCH transmission for the DL HARQ may be operated through PCell or SCell, and the serving cell which the PUCCH is transmitted may be called as a "PUCCH transmission serving cell." Hereinafter, PCell is assumed to be the PUCCH transmission serving cell.

First, the HARQ ACK/NACK transmission timing for the PDCCH/EPDCCH that indicates the PDSCH transmission in the PCell or SPS release is following the Table 5 below.

TABLE 5

When a FDD is a PCell, apply the FDD DL HARQ timing as defined in the current Rel-8.
When a TDD is PCell and non-eIMTA cell, apply the DL HARQ timing corresponding to the TDD UL/DL configuration as defiend in the SIB1 (refer to Table 3).
When a TDD is PCell, and eIMTA cell, apply the DL-reference UL/DL configuration configured through a RRC signaling Referring Table 5, when a TDD is PCell, and eIMTA cell, the DL-reference UL/DL configuration information is transmitted from a base station to a UE through a RRC signaling. The DL-reference UL/DL configuration may be transmitted through a RRC signaling as defined as a value chosen among the TDD UL/DL configuration {2, 4, 5}.

Meanwhile, in the aspects of the present invention, the following methods and assumption may be applied for a TDD-FDD DL HARQ timing suggestion.

1. In a case of self-scheduling: a DL HARQ timing for a serving cell which a PDSCH is transmitted (for example, SCell) may be obtained based on a relationship between the serving cell and a PUCCH transmission serving (for example, PCell).

2. In a case of cross-carrier (or subframe) scheduling:

1) When a PUCCH transmission serving is same as a scheduling cell: a DL HARQ timing for a scheduled cell which a PDSCH is transmitted (SCell) may be obtained based on a relationship between the scheduled cell and the serving cell which the PUCCH is transmitted (PCell).

2) When a PUCCH transmission serving cell is not same as a scheduling cell:

Alternative 1: The DL HARQ timing for the scheduled cell which the PDSCH is transmitted (SCell) may be obtained based on a relationship between the scheduled cell and the PUCCH transmission serving cell, or Alternative 2: The DL HARQ timing for the scheduled cell which the PDSCH is transmitted (SCell) may be obtained based on a relationship between a scheduling cell and the PUCCH transmission serving cell.

Figure 8:
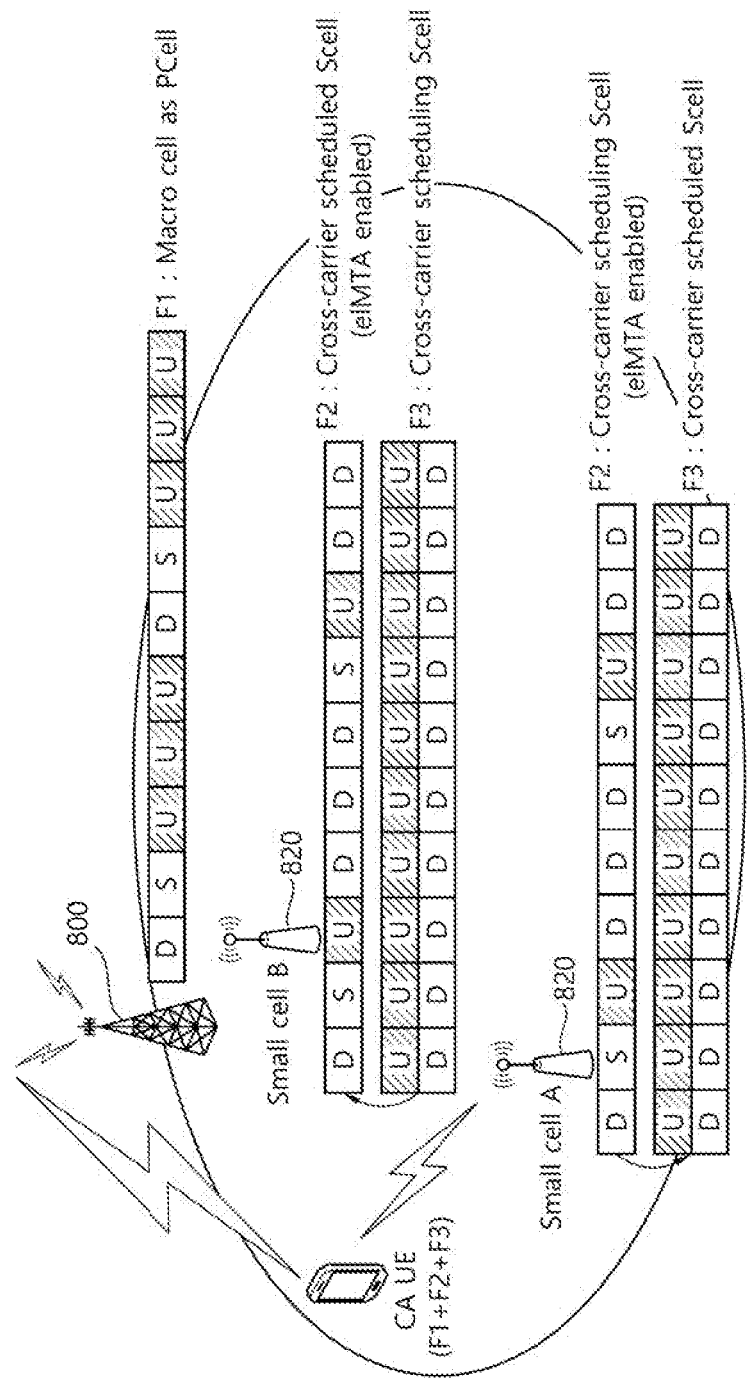
FIG. 8 is a diagram illustrating example of a TDD-FDD CA scenario in a case where three serving cells are aggregated.

Examples of abovementioned alternatives is explained referring to the FIG. 8.

FIG. 8 is a diagram illustrating example of a TDD-FDD CA scenario in a case where three serving cells are aggregated.

Referring FIG. 8, a macro base station 800 provides a service to a UE through a PCell which is a macro cell, and a small base station 820 provides a service to a UE through a SCell#1 and a SCell#2 which are small cells. A UE is configured with a CA among the abovementioned PCell, SCell#1, and SCell#2. The PCell uses a F1 frequency band, the SCell#1 uses a F2 frequency band, and the SCell#2 may use a F3 frequency band. Also, at least one of the PCell, SCell#1, and SCell#2 may be configured to FDD, and the remainings may be configured to TDD.

For example, a macro base station 800 may provide a service to a UE to save energy, minimize the interference among base stations, and guarantee the minimum mobility to a UE by configuring a PCell, for example, with the TDD UL/DL configuration 0. And a small base station 820 may provide a service to a UE, for the purpose of traffic offloading, through the SCell#1 and the SCell#2. In this case, for example, the SCell#1 may be configured to the TDD UL/DL configuration #1 and the SCell#2 may be configured to the FDD. Meanwhile, in this case, depends on how the CIF value configured, the SCell#1 may be a scheduled cell and the SCell#2 may be a scheduling cell, or the SCell#1 may be a scheduling cell and the SCell#2 may be a scheduled cell.

When the SCell#1 is scheduled cell and the SCell#2 is scheduling cell, the DL HARQ timing according to the abovementioned method 1 may be shown as following Table 6.

3. If a TTD eIMTA (that is, dynamic TDD UL/DL configuration) enabled TDD serving cell exists among the TDD-FDD CA serving cells, the TDD UL/DL configuration defined in SIB 1 may be replaced with or referred to the DL HARQ reference configuration configured through a RRC signaling. For example, a CA of the TDD eIMTA enabled PCell and the FDD based SCell, considering the DL HARQ timing for the SCell, without considering the TDD UL/DL configuration of the PCell, may consider the DL reference UL/DL configuration configured through a RRC signaling for the eIMTA operation.

In above, a DL HARQ timing detection method is suggested, which may be applied for various scenarios as an overall framework. Hereinafter, it explains how a certain DL HARQ timing is applied to the SCell, based on a relationship with the PUCCH transmission serving cell (PCell).

Figure 9:
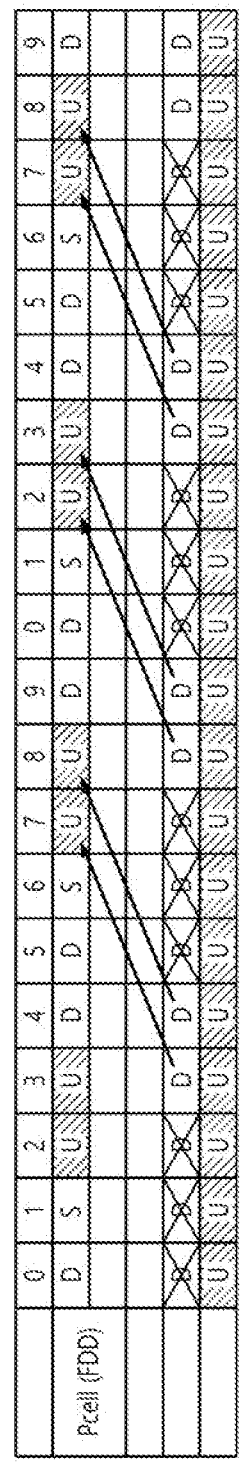
FIG. 9 is a diagram illustrating example of a DL HARQ timing in case of a TDD-FDD CA configured UE is operating by self-scheduling.

Case 1. TDD(Pcell)-FDD(Scell) CA 1.1 In a case of self-scheduling:

FIG. 9 is a diagram illustrating example of a DL HARQ timing in case of a TDD-FDD CA configured UE is operating by self-scheduling. In FIG. 9, PCell is configured to the TDD UL/DL configuration 1, and SCell is configured to the FDD.

When a UE is operated by self-scheduling as in FIG. 9, the existing FDD DL HARQ may be applied to the SCell. However, in this case, because a PCell, which is the PUCCH transmission serving cell, is configured to the TDD, the PDSCH cannot be transmitted in a many number of DL subframe when considering a location of a UL subframe of the PCell. This becomes a cause to decrease the peak data rate which a UE may able to support.

To solve the abovementioned problem, the aspects of the present invention suggest as follows.

TABLE 6

The DL HARQ timing for a PCell: Following the DL HARQ timing based on the TDD UL/DL configuration as defined in SIB1 (If eIMTA is enabled, the TDD UL/DL configuration defined in SIB1 may be replaced with the DL-reference UL/DL configuration configured through a RRC signaling).
The DL HARQ timing for #SCell#1 (scheduled cell): Following the DL HARQ timing considering a relationship between the PUCCH transmission cell (PCell) and the scheduled cell (SCell#1) (If eIMTA is enabled, the TDD UL/DL configuration defined in SIB1 may be replaced with the DL-reference UL/DL configuration configured through a RRC signaling).
The DL HARQ timing for #SCell#2 (scheduling cell): Following the DL HARQ timing considering a relationship between the PUCCH transmission cell (PCell) and the scheduling cell (SCell#2) (If eIMTA is enabled, the TDD UL/DL configuration defined in SIB1 may be replaced with the DL-reference UL/DL configuration configured through a RRC signaling).

Meanwhile, the DL HARQ timing according to the abovementioned method 2 can be shown as following Table 7.

TABLE 7

The DL HARQ timing for a PCell: Following the DL HARQ timing based on the TDD UL/DL configuration as defined in SIB1 (If eIMTA is enabled, the TDD UL/DL configuration defined in SIB1 may be replaced with the DL-reference UL/DL configuration configured through a RRC signaling).
The DL HARQ timing for SCell#1 (scheduled cell): Following the DL HARQ timing considering a relationship between the PUCCH transmission cell (PCell) and the scheduling cell (SCell#2) (If eIMTA is enabled, the TDD UL/DL configuration defined in SIB1 may be replaced with the DL-reference UL/DL configuration configured through a RRC signaling).
The DL HARQ timing for SCell#2 (scheduling cell): Following the DL HARQ timing considering a relationship between the PUCCH transmission cell (PCell) and the scheduling cell (SCell#2) (If eIMTA is enabled, the TDD UL/DL configuration defined in SIB1 may be replaced with the DL-reference UL/DL configuration configured through a RRC signaling).

First Exemplary Embodiment: A Method Based on the DL HARQ Reference Configuration Table This is a method to apply an appropriate DL reference UL/DL configuration according to each TDD-FDD CA combination at the DL HARQ timing defined in the existing TDD UL/DL configuration, as similar to the existing interband TDD CA. Here, regarding the serving cell that the PDCCH/EPDCCH which indicates the PDSCH (or SPS release) is targeting, it is important to determine which DL reference UL/DL configuration is applied as the DL HARQ timing for the serving cell according to the TDD-FDD CA combination. This may be determined by following standards.

(1) First, among the TDD UL/DL configurations, the configuration with higher number of DL subframe associated with the DL HARQ-ACK reporting regarding the PDSCH transmitted through a plurality of DL subframe may be selected as a DL reference UL/DL configuration candidate. This is where a SCell may be a FDD cell, and to make the PDSCH scheduling as much as possible for the SCell. The following Table 8 shows the number of DL subframes (including a special subframe) according to the TDD UL/DL configuration.

3 has 7 DL subframes, the TDD UL/DL configuration 5 has 9 DL subframes, which has the largest number of DL subframes. As explained in FIG. 3, the special subframe includes the DwPTS, and may be treated as DL subframe.

A DL reference UL/DL configuration candidate set may be decided as following based on the number of DL subframes.

A. Candidate set #1: TDD UL/DL configuration {2, 3, 4, 5}

B. Candidate set #2: TDD UL/DL configuration {2, 4, 5}

Here, the candidate #1 includes the TDD UL/DL configurations with 7 or more DL subframes for the HARQ, ad the candidate #2 includes the TDD UL/DL configuration with 8 or more subframes for the HARQ.

(2) If, among the possible TDD UL/DL configurations in the candidate sets, the TDD UL/DL configurations that may not be applied as the DL HARQ timing for the SCell according to the TDD-FDD CA combination are removed, the candidate set #1 regarding the DL reference UL/DL configuration may become as shown in following Table 9 and the candidate set #2 may become as shown in following Table 10.

TABLE 9

| TDD-FDD CA combinations | Possible TDD UL/DL configurations |
| --- | --- |
| TDD UL/DL configuration 0(Pcell)-FDD(Scell) CA | 2, 3, 4, 5 |
| TDD UL/DL configuration 1(Pcell)-FDD(Scell) CA | 2, 4, 5 |
| TDD UL/DL configuration 2(Pcell)-FDD(Scell) CA | 2, 5 |
| TDD UL/DL configuration 3(Pcell)-FDD(Scell) CA | 3, 4, 5 |
| TDD UL/DL configuration 4(Pcell)-FDD(Scell) CA | 4, 5 |
| TDD UL/DL configuration 5(Pcell)-FDD(Scell) CA | 5 |
| TDD UL/DL configuration 6(Pcell)-FDD(Scell) CA | 2, 3, 4, 5 |

TABLE 10

| TDD-FDD CA combinations | Possible TDD UL/DL configurations |
| --- | --- |
| TDD UL/DL configuration 0(Pcell)-FDD(Scell) CA | 2, 4, 5 |
| TDD UL/DL configuration 1(Pcell)-FDD(Scell) CA | 2, 4, 5 |
| TDD UL/DL configuration 2(Pcell)-FDD(Scell) CA | 2, 5 |
| TDD UL/DL configuration 3(Pcell)-FDD(Scell) CA | 4, 5 |
| TDD UL/DL configuration 4(Pcell)-FDD(Scell) CA | 4, 5 |
| TDD UL/DL configuration 5(Pcell)-FDD(Scell) CA | 5 |
| TDD UL/DL configuration 6(Pcell)-FDD(Scell) CA | 2, 4, 5 |

TABLE 8

| TDD UL/DL configuration | # of DL subframes for HARQ-ACK in a radio frame |
| --- | --- |
| 0 | 4 |
| 1 | 6 |
| 2 | 8 |
| 3 | 7 |
| 4 | 8 |
| 5 | 9 |
| 6 | 5 |

As shown in Table 8, the TDD UL/DL configurations 2 and 4 have 8 DL subframes, the TDD UL/DL configuration (3) Hereinafter, among remaining combinations other than the TDD UL/DL configuration 5-FDD CA combination, the TDD UL/DL configuration 5 is excluded from the possible TDD UL/DL configurations. This is because the HARQ-ACK transmission method is limited to the PUCCH format 3. In the case of the TDD UL/DL configuration 5-FDD CA combination, the TDD UL/DL configuration 5 is applied.

In a case of selecting the TDD UL/DL configuration that supports the HARQ-ACK report regarding either the highest or the lowest number of DL subframe, among the possible TDD UL/DL configurations regarding each combinations, the candidate set #1 may become as shown in following Table 11 and the candidate set #2 may become as shown in following Table 12.

TABLE 11

| TDD-FDD CA combinations | Possible TDD UL/DL configurations |
|---|---|
| TDD UL/DL configuration 0(Pcell)-FDD(Scell) CA | 3 |
| TDD UL/DL configuration 1(Pcell)-FDD(Scell) CA | 2, 4 |
| TDD UL/DL configuration 2(Pcell)-FDD(Scell) CA | 2 |
| TDD UL/DL configuration 3(Pcell)-FDD(Scell) CA | 3 |
| TDD UL/DL configuration 4(Pcell)-FDD(Scell) CA | 4 |
| TDD UL/DL configuration 5(Pcell)-FDD(Scell) CA | 5 |
| TDD UL/DL configuration 6(Pcell)-FDD(Scell) CA | 3 |

TABLE 12

| TDD-FDD CA combinations | Possible TDD UL/DL configurations |
|---|---|
| TDD UL/DL configuration 0(Pcell)-FDD(Scell) CA | 2, 4 |
| TDD UL/DL configuration 1(Pcell)-FDD(Scell) CA | 2, 4 |
| TDD UL/DL configuration 2(Pcell)-FDD(Scell) CA | 2 |
| TDD UL/DL configuration 3(Pcell)-FDD(Scell) CA | 4 |
| TDD UL/DL configuration 4(Pcell)-FDD(Scell) CA | 4 |
| TDD UL/DL configuration 5(Pcell)-FDD(Scell) CA | 5 |
| TDD UL/DL configuration 6(Pcell)-FDD(Scell) CA | 2, 4 |

(4) If there are several number of the TDD UL/DL configurations after the abovementioned process, it may choose one TDD UL/DL configuration. For example, it may choose the TDD UL/DL configuration which has relatively short or long HARQ Round Trip Time (RTT) delay as final. In this case, as an example, the finally chosen candidate set 1 may be shown as following Table 13, and the candidate set #2 may be shown as following Table 14.

TABLE 13

| TDD-FDD CA combinations | DL reference UL/DL configurations |
|---|---|
| TDD UL/DL configuration 0(Pcell)-FDD(Scell) CA | 3 |
| TDD UL/DL configuration 1(Pcell)-FDD(Scell) CA | 2 |
| TDD UL/DL configuration 2(Pcell)-FDD(Scell) CA | 2 |
| TDD UL/DL configuration 3(Pcell)-FDD(Scell) CA | 3 |
| TDD UL/DL configuration 4(Pcell)-FDD(Scell) CA | 4 |
| TDD UL/DL configuration 5(Pcell)-FDD(Scell) CA | 5 |
| TDD UL/DL configuration 6(Pcell)-FDD(Scell) CA | 3 |

TABLE 14

| TDD-FDD CA combinations | DL reference UL/DL configurations |
|---|---|
| TDD UL/DL configuration 0(Pcell)-FDD(Scell) CA | 2 |
| TDD UL/DL configuration 1(Pcell)-FDD(Scell) CA | 2 |
| TDD UL/DL configuration 2(Pcell)-FDD(Scell) CA | 2 |
| TDD UL/DL configuration 3(Pcell)-FDD(Scell) CA | 4 |
| TDD UL/DL configuration 4(Pcell)-FDD(Scell) CA | 4 |
| TDD UL/DL configuration 5(Pcell)-FDD(Scell) CA | 5 |
| TDD UL/DL configuration 6(Pcell)-FDD(Scell) CA | 2 |

Or, as another example, the finally chosen candidate set #1 may be shown as following Table 15, and the candidate set #2 may be shown as following Table 16.

TABLE 15

| TDD-FDD CA combinations | DL reference UL/DL configurations |
|---|---|
| TDD UL/DL configuration 0(Pcell)-FDD(Scell) CA | 3 |
| TDD UL/DL configuration 1(Pcell)-FDD(Scell) CA | 4 |
| TDD UL/DL configuration 2(Pcell)-FDD(Scell) CA | 2 |
| TDD UL/DL configuration 3(Pcell)-FDD(Scell) CA | 3 |

TABLE 15-continued

| TDD-FDD CA combinations | DL reference UL/DL configurations |
|---|---|
| TDD UL/DL configuration 4(Pcell)-FDD(Scell) CA | 4 |
| TDD UL/DL configuration 5(Pcell)-FDD(Scell) CA | 5 |
| TDD UL/DL configuration 6(Pcell)-FDD(Scell) CA | 3 |

TABLE 16

| TDD-FDD CA combinations | DL reference TDD UL/DL configurations |
|---|---|
| TDD UL/DL configuration 0(Pcell)-FDD(Scell) CA | 4 |
| TDD UL/DL configuration 1(Pcell)-FDD(Scell) CA | 4 |
| TDD UL/DL configuration 2(Pcell)-FDD(Scell) CA | 2 |
| TDD UL/DL configuration 3(Pcell)-FDD(Scell) CA | 4 |
| TDD UL/DL configuration 4(Pcell)-FDD(Scell) CA | 4 |
| TDD UL/DL configuration 5(Pcell)-FDD(Scell) CA | 5 |
| TDD UL/DL configuration 6(Pcell)-FDD(Scell) CA | 4 |

The DL reference UL/DL configuration which may be applied according to each TDD-FDD CA combination may be determined based on above Table 13, 14, 15, or 16. Based on abovementioned methods and Tables, in a case whether a PCell is a TDD cell and a SCell is a FDD cell, it may provide the optimal DL reference UL/DL configuration for the SCell. In this case, an impact to the standard specification and implementation is small, and it may provide a best performance considering the appropriate trade-off regarding the HARQ-ACK transmission method and DL subframes which may be scheduling

Second Exemplary Embodiment: A Method Based on a RRC Signaling

The second exemplary embodiment is similar to the first exemplary embodiment in a way that utilizing the DL reference UL/DL configuration as a DL HARQ timing regarding the PDSCH transmitted in a SCell. However, different from the first exemplary embodiment, it provide more freedom to a base station vendor or operator by transmitting the DL reference UL/DL configuration through a RRC signaling and noy using predetermined table value between a UE and a base station. Referring to the second exemplary embodiment, one of the DL reference UL/DL configuration candidate sets as suggested in following Table 17, regarding a case where a CA which a PCell is a TDD cell and a SCell is a FDD cell, may be determined as the DL reference UL/DL configuration set for the SCell, and a certain TDD UL/DL configuration value in the set may be configured to a UE through a RRC signaling configuration value transmitted through the RRC signaling, may apply the DL HARQ timing regarding the PDSCH transmitted in the SCell and perform the HARQ ACK/NACK transmission.

1.2 in a Case of Cross-Carrier Scheduling

Figure 10:
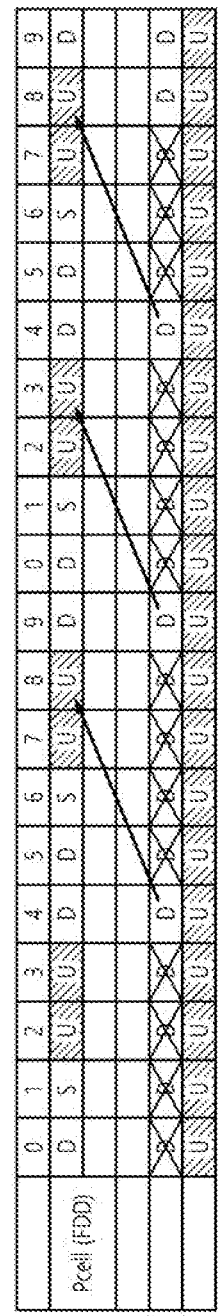
FIG. 10 is a diagram illustrating example of a DL HARQ timing in case of a TDD-FDD CA configured UE is operating by cross-carrier scheduling.

FIG. 10 is a diagram illustrating example of a DL HARQ timing in case of a TDD-FDD CA configured UE is operating by cross-carrier scheduling. In FIG. 10, the PCell is configured to the TDD UL/DL configuration 1 and the SCell is configured to the FDD.

As in FIG. 10, if a UE is configured with a cross-carrier scheduling and the existing FDD DL HARQ timing is applied to a SCell, because a PCell, which is a PUCCH transmission serving cell, is configured to a TDD, it may bring a result that a PDSCH cannot be transmitted in many number of DL subframes, caused not only by the problems in the UL subframe of the PCell for the PUCCH transmission, but also by problems with non-existence of the DL scheduling indication method. For example, in a case of self-scheduling, a UE may able to receive the PDCCH/EPDCCH that indicate a PDSCH and the abovementioned PDSCH in the subframe #3 of a SCell, and the corresponding HARQ ACK/NACL may be transmitted from the subframe #7 to a base station. However, in a case of cross-carrier scheduling, because the #3 subframe of the PCell with the TDD UL/DL configuration 1 is a UL subframe, the PDCCH/EPDCCH that indicate the PDSCH cannot be transmitted, and therefore, a UE cannot transmits the HARQ ACK/NACK in #7 subframe.

To solve those abovementioned problems, aspects of the present invention introduce a cross-subframe scheduling

TABLE 17

A. DL reference UL/DL configuration candidate set #1: TDD UL/DL configuration {2, 3, 4, 5} or,
B. DL reference UL/DL configuration candidate set #2: TDD UL/DL configuration {2, 4, 5} or,
C. DL reference UL/DL configuration candidate set #3: TDD UL/DL configuration {2, 5} or,
D. DL reference UL/DL configuration candidate set #4: TDD UL/DL configuration {4, 5}

For example, in a case where a DL reference UL/DL configuration candidate set #2 is a TDD(PCell)-FDD(SCell) CA, it may be a DL reference UL/DL configuration set for the SCell, and a base station may transmit a value from the TDD UL/DL configuration {2, 4, 5} as a DL reference UL/DL configuration value for the SCell to a UE through a RRC signaling. The UE, based on the DL reference UL/DL (even with this case, the DL HARQ timing problem caused by the UL subframe location of a PCell still remains). According to an exemplary configuration, a base station, through a cross-subframe scheduling, may transmit a PDCCH/EPDCCH which indicates the abovementioned PDSCH, through a PCell, in a subframe different from a subframe in which the PDSCH of a SCell is transmitted. A cross-subframe scheduling may be configured to a UE through a RRC scheduling. In this case, the first exemplary embodiment as explained in 1.1 or the DL HARQ timing of the second exemplary embodiment may be applied to a UE configured with the cross-carrier scheduling and the cross-subframe scheduling.

Case 2. FDD(Pcell)-TDD(Scell) CA

2. In Case of Self-Scheduling and/or Cross-Carrier Scheduling

Figure 11:
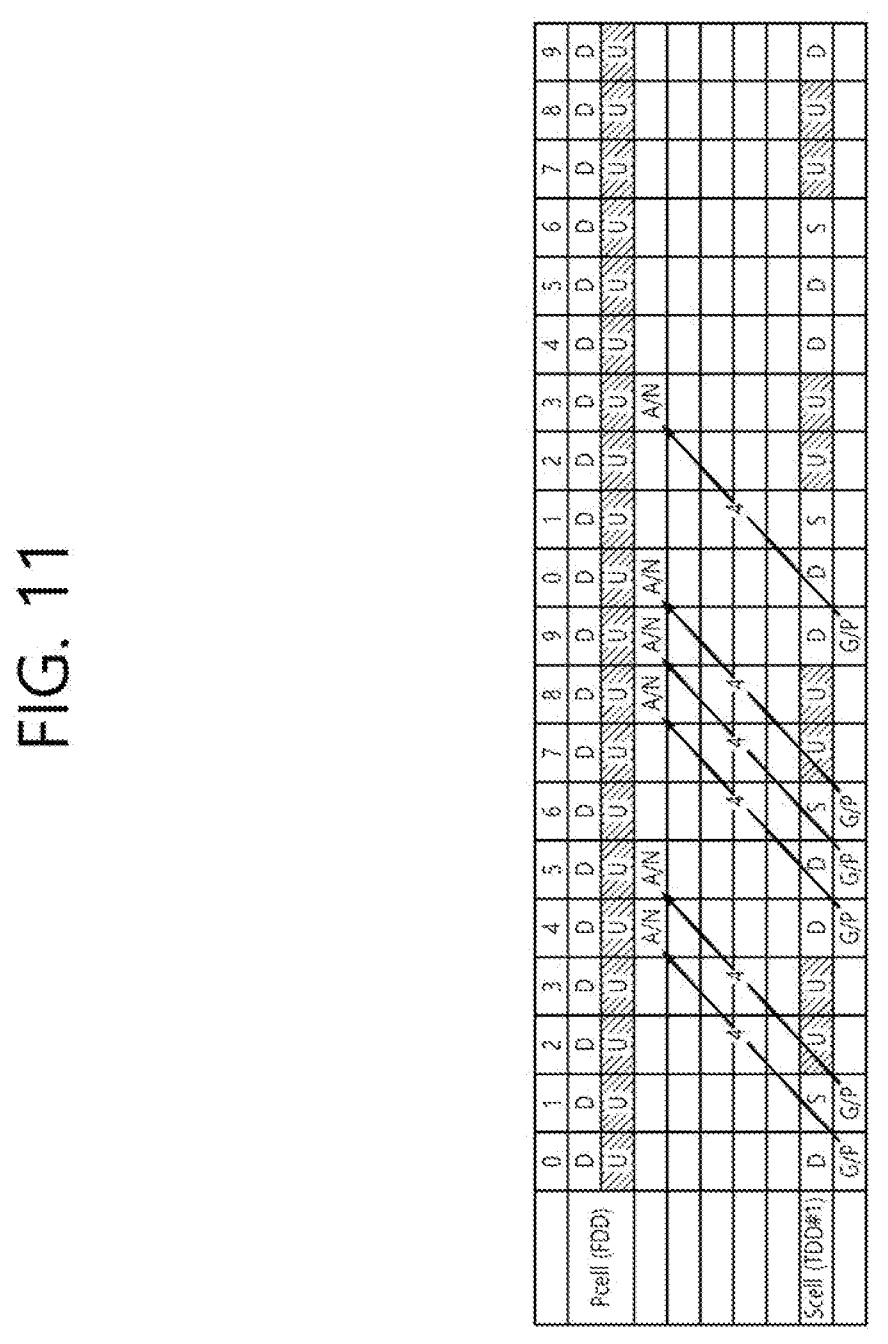

FIG. 11 is a diagram illustrating example of a DL HARQ timing in a TDD-FDD CA configured UE. In FIG. 11, a PCell is configured with a FDD, and a SCell is configured with the TDD UL/DL configuration 1. FIG. 11 is an example of an application of the FDD DL HARQ timing.

Referring FIG. 11, G shows a DL grant, P shows a PDSCH, A/N shows a HARQ ACK/NACK reporting. As in FIG. 11, in a case where the PUCCH transmission serving cell is a FDD cell, the DL HARQ timing regarding the PDSCH transmitted in other aggregated serving cells may follows the DL HARQ timing which applies every FDD cell, regardless a duplex mode and a TDD UL/DL configuration of an SCell. That is, a UE transmits the HARQ response in subframe n of a PCell, if the PDSCH transmission for the UE is detected in subframe n-4 of an SCell.

Similar to the case 1, when an FDD cell is a PCell and a TDD cell is an SCell, a base station may perform a cross-subframe scheduling. In this configuration, a PDSCH may be transmitted in a subframe of an SCell and a PDCCH/EPDCCH that indicates the PDSCH transmission may be transmitted in a different subframe of a PCell. The cross-subframe scheduling may be indicated to the UE through an RRC signaling and the UE may set the cross-subframe scheduling accordingly. The DL HARQ timing may be determined such that the UE transmits the HARQ response in subframe n of a PCell, if the PDSCH transmission for the UE is detected in subframe n-4 of an SCell. If the cross-subframe scheduling is not established, the PDCCH/EPDCCH and the PDSCH may be transmitted through the SCell.

Figure 12:
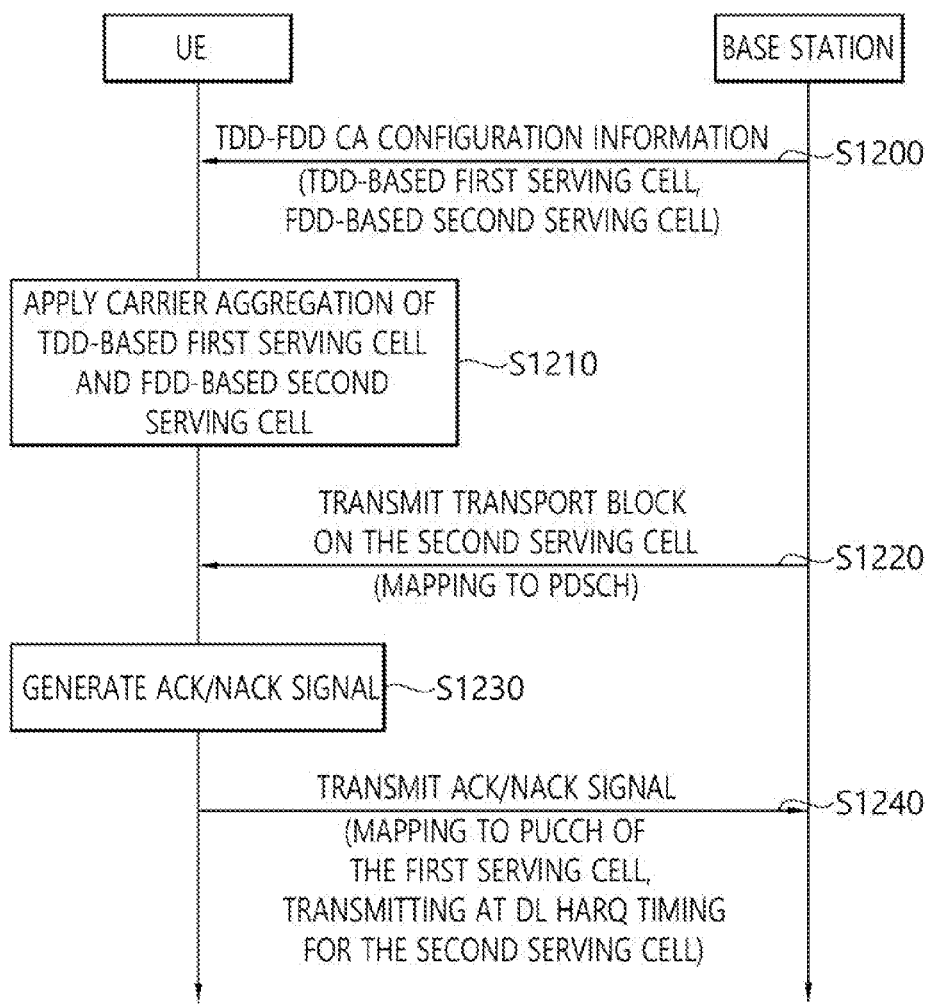
FIG. 12 is a block diagram illustrating an example of a base station and a UE performing the DL HARQ operation according to an exemplary embodiment of the present invention.

FIG. 12 is a block diagram illustrating an example of a base station and a UE performing the DL HARQ operation as an exemplary embodiment of the present invention.

In FIG. 12, it explains based on a case where a UE is configured with a CA of a TDD based serving cell and a FDD based serving cell, and as explained above, the aspect of present invention may be applied not only to a CA, but also where a dual connectivity is configured.

Referring FIG. 12, a base station transmits the TDD-FDD CA configuration information which indicates the CA of the TDD based first serving cell and the FDD based second serving cell to a UE S1200. The TDD-FDD CA configuration information may include the TDD UL/DL configuration information of the TDD based first serving cell. A base station may transmit the TDD-FDD CA configuration information to a UE through a RRC signaling. Further, a base station may transmit cross-carrier scheduling configuration information to a UE.

A UE applies a CA of the TDD based first serving cell and the FDD based second serving cell, based on the TDD-FDD CA configuration information S1210. In this case, the first serving cell might be a PCell, and the second serving cell might be a SCell. Or, the first serving cell might be a SCell, and the second serving cell might be a PCell. Hereinafter, it assumes that the first serving cell is a PCell. A UE may apply a cross-carrier scheduling, if it received more of the abovementioned cross-carrier scheduling information.

A base station, based on the TDD UL/DL configuration of the abovementioned first serving cell, at least through one DL subframe, transmits at least one transport block mapping to the PDSCH in the second serving cell to a UE S1220. A transport block is mapping to a codeword, and at least one ACK/NACK signal might be corresponding to each transmission block.

A UE, at least through one DL subframe, create an ACK/NACK signal which shows either successful or unsuccessful reception of at least one transport block in the second serving cell S1230.

A UE, from the DL subframe which received the transport block, transmits the ACK/NACK signal mapping to the PUCCH of the first serving cell to a base station, at the DL HARQ timing for the second serving cell in the TDD-FDD CA S1240. Here, the DL HARQ timing for the second serving cell may be determined based on the predefined DL reference UL/DL configuration information between the UE and the base station (refer to the Table 13 or Table 16 from the first exemplary embodiment). Or, the DL HARQ timing for the second serving cell may be transmitted from the base station to the UE through a RRC signaling which indicates one of the TDD UL/DL configuration included in the DL reference UL/DL configuration candidate set (refer to Table 17 of the second exemplary embodiment) as the DL reference UL/DL configuration.

Meanwhile, although not shown in FIG. 12, a TDD based third serving cell may be configured to a UE, and when a UE is configured with a cross-carrier scheduling, a second serving cell is scheduled cell and a third serving cell is scheduling cell, the DL reference UL/DL configuration value for the DL HARQ timing of the second serving cell may be determined by the abovementioned Table 4 based on the TDD UL/DL configuration of the third serving cell which is a scheduling cell. In this case, "Secondary cell UL/DL configuration" of the Table 4 may include the TDD UL/DL configuration of the third serving cell which is a scheduling cell.

Figure 13:
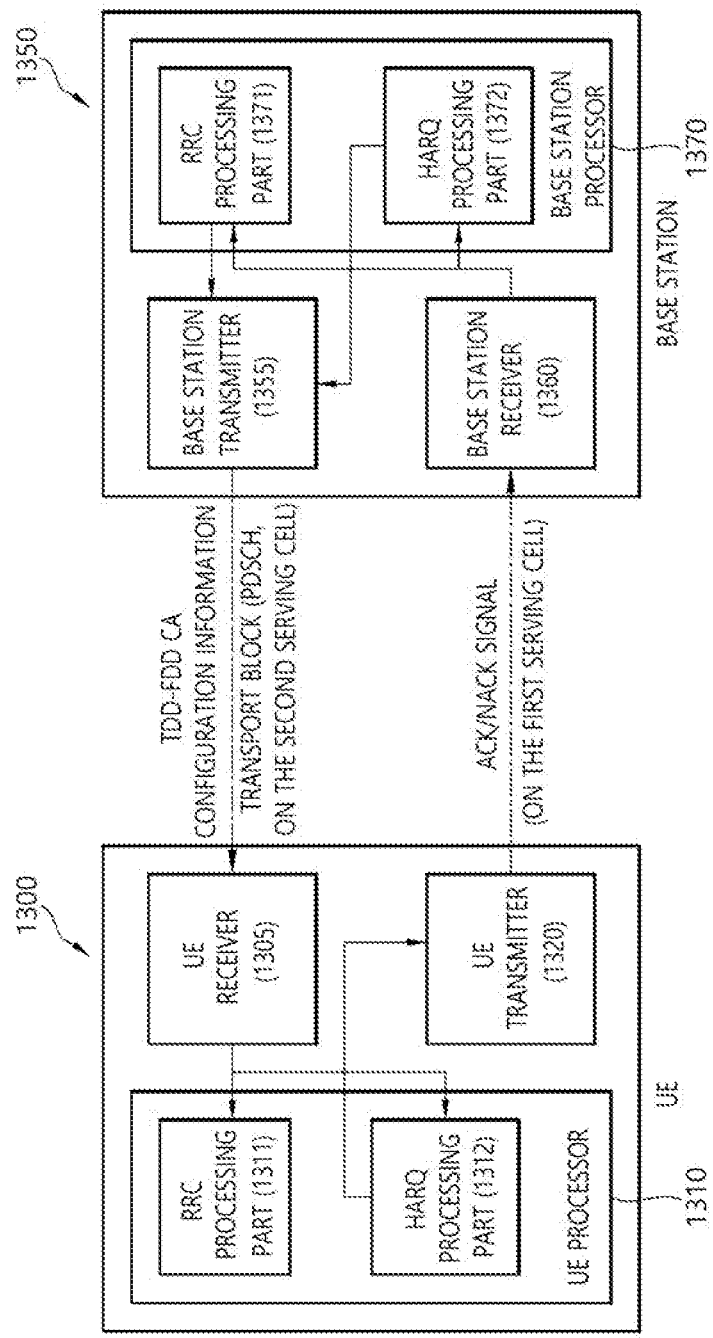
FIG. 13 is a block diagram illustrating a UE and a base station according to an exemplary embodiment of the present invention.

FIG. 13 is a block diagram illustrating a UE and a base station as an exemplary embodiment of the present invention.

Referring to FIG. 13, a UE 1300 includes a UE receiver 1305, a UE processor 1310, and a UE transmitter 1320. A UE processor 1310 also includes a RRC processor 1311 and the HARQ processor 1312. The UE processor 1310 may be a single processor having an RRC processing part 1311 and an HARQ processing part 1312 or may be a plurality of processors. The UE receiver 1305 and the UE transmitter 1320 may be implemented as a single transceiver or separate receiver and transceiver.

The UE receiver 1305 receives TDD-FDD CA configuration information which indicates the CA of the TDD based first serving cell and the FDD based second serving cell from the base station 1305, and transmits it to the RRC processor 1311. The TDD-FDD CA configuration information includes the TDD UL/DL configuration information of the first serving cell. The UE receiver 1305 may receive cross-carrier scheduling configuration information from the base station 1350. Also, the UE receiver 1305 may receive information which indicates one of the TDD UL/DL configuration included in the DL reference UL/DL configuration candidate set as described in Table 17 as a DL reference UL/DL configuration from the base station. Also, a UE receiver 1305 receives a transport block mapping to the PDSCH in the second serving cell. At that time, a UE receiver 1305 may receive many transport blocks at least through one DL subframe. For example, when the first and the second DL subframe are continuous subframes, a UE receiver 1305 may receive the first transport block mapping to the PDSCH1 in the first DL subframe and may receive the second transport block mapping to the PDSCH2 in the second DL subframe.

The RRC processor 1311 applies the CA configuration of the TDD based first serving cell and the FDD based second serving cell based on the abovementioned TDD FDD CA configuration information to the UE 1300. In this case, the RRC processor 1311 may configure the abovementioned first serving cell as a PCell and the abovementioned second serving cell as a SCell based on the above TDD-FDD CA configuration information to the UE 1300. Also, the RRC processor 1311 may apply a cross-carrier scheduling to the UE 1300 based on the above cross-carrier scheduling configuration information. In addition, the RRC processor 1311 may transmit the DL reference UL/DL configuration information for the second serving cell based on information which indicates one of the TDD UL/DL configuration included in the DL reference UL/DL configuration candidate set as a DL reference UL/DL configuration to the HARQ processor 1312.

The HARQ processor 1312 determines the successfulness or unsuccessfulness reception of the transport block received by the UE receiver, and creates an ACK/NACK signal based on the result of the decision. The HARQ processor 1312 may decide the DL HARQ timing for the second serving cell based on the TDD-FDD CA configuration and the TDD UL/DL configuration of the first serving cell applied by the RRC processor. As an example, the HARQ processor 1312 may determine the DL HARQ timing for the second serving cell based on the predefined DL reference UL/DL configuration information as described by Table 13 or Table 16. As an another example, the HARQ processor 1312 may determine the DL HARQ timing for the second serving cell based on information which indicates one of the TDD UL/DL configuration included in the DL reference UL/DL configuration candidate set as a DL reference UL/DL configuration which received by the UE receiver 1305 and processed by the RRC processor 1311.

The UE transmitter 1320 transmits the HARQ ACK-.BACK signal in a PCell to the base station 1350 based on the DL HARQ timing determined by the HARQ processor 1312.

The base station 1350 includes a base station transmitter 1355, a base station receiver 1360 and a base station processor 1370. The base station processor 1370 also includes a RRC processor 1371 and a HARQ processor 1372. The base station processor 1370 may be a single processor having an RRC processing part 1371 and an HARQ processing part 1372 or may be a plurality of processors. The base station receiver 1360 and the UE transmitter 1355 may be implemented as a single transceiver or separate receiver and transceiver.

The RRC processor 1371 creates the abovementioned TDD-FDD CA configuration information, and transmits it to the base station transmitter 1355. The RRC processor 1371 also creates cross-carrier scheduling configuration information, and transmits it to the base station transmitter 1355.

The base station transmitter 1355 transmits the TDD-FDD CA configuration information and/or the cross-carrier scheduling configuration information to the UE 1300 through a RRC signaling. In this case, the RRC signaling may become a RRC connection reconfiguration message. Also, the base station transmitter transmits the transport block mapping to the PDSCH in the second serving cell to the UE 1300, based on a TDD UL/DL configuration of the first serving cell. At this time, the base station transmitter 1355 may transmits a plurality of transport blocks to the UE 1300 through at least DL subframe.

The base station receiver 1360 receives an ACK/NACK signal from the UE 1300 at the DL HARQ timing for the second serving cell in a DL subframe of the first serving cell. The ACK/NACK signal may received by mapping to the PUCCH of the first serving cell.

The HARQ processor 1372 performs the HARQ operation according to an ACK/NACK signal received by the base station receiver 1360. For example, the ACK/NACK signal is an ACK, the HARQ processor 1372 transmits the prepared new transport block to the base station transmitter 1355, and the base station transmitter 1355 transmits the new transport block to the UE 1300. But, if the ACK/NACK signal is a NACK, the HARQ processor 1372 transmits transport blocks mapping to the DL subframe associated with the UL subframe which the ACK/NACK signal is transmitted to the base station transmitter 1355, and the base station transmitter 1355 re-transmits the abovementioned transport blocks to the UE 1300.

According to aspects, a base station transmits a PDSCH and a UE transmits an HARQ response in response to the PDSCH. The base station and the UE may configure a TDD cell as a primary serving cell and set an RRC connection through the TDD-based primary serving cell. The base station may transmit CA configuration information to the UE such that the UE can configure an FDD cell as a secondary serving cell. In this configuration, a TDD-FDD CA is configured. In the TDD-FDD joint operation, the interval between the PDSCH transmission and the HARQ response may be determined based on an FDD mode configuration although the PDSCH is transmitted through a TDD-based primary serving cell. Such interval configuration may be determined by a signaling from the base station or the UE may be configured to store such information in advance. When the TDD-FDD CA is configured for the UE, the UE may determine the interval to be k=4 although the PDSCH is transmitted through a TDD-based serving cell. For example, if the PDSCH is transmitted in a subframe n−4, the UE transmits the HARQ response in a subframe n.

The base station may configure a cross-carrier scheduling between two or more aggregated serving cells. For example, an FDD-based primary serving cell may be a scheduling cell, and a TDD-based secondary serving cell may be a scheduled cell, which is scheduled by the scheduling cell. In a cross-carrier scheduling scheme, a control channel for a scheduled cell may be transmitted through a scheduling cell. For example, a PDCCH or an EPDCCH for a scheduled cell may be transmitted through a scheduling cell of the scheduled cell. The cross-carrier scheduling information may be transmitted from the base station to the UE through an RRC signaling.

All of the above explanations are only to explain the technical aspects of the present invention, and it will be apparent to those having ordinary skills in the art that modifications and variations can be made without departing from the spirit and scope of the present invention. Thus, the exemplary embodiments of the present inventions are not to limit the technical aspects of the present invention, but only to explain. The scope of protection of the present invention should be interpreted according to the appended claims, and all technology descriptions in the equivalent range should be interpreted to be included in the scope of right of the present invention.

What is claimed is:

1. A User Equipment (UE) to transmit a Hybrid Automatic Repeat reQuest (HARQ) response, the UE comprising:
a processor to establish a Radio Resource Control (RRC) connection with a base station through a first serving cell, the first serving cell supporting a Frequency Division Duplex (FDD) mode;
a receiver to receive an RRC message through the first serving cell, the RRC message comprising carrier aggregation (CA) configuration information, the CA configuration information comprising information of a second serving cell supporting a Time Division Duplex (TDD) mode, and the first serving cell and the second serving cell being aggregated by an FDD-TDD CA scheme, and to receive at least one of a Physical Downlink Control Channel (PDCCH) and an Enhanced PDCCH (EPDCCH) through the second serving cell; and
a transmitter,
wherein the processor detects, based on resource allocation information included in the at least one of the PDCCH and the EPDCCH, a Physical Downlink Shared Channel (PDSCH) transmitted from the base station through the second serving cell, the PDSCH being received in a subframe n−4, wherein n−4 is an integer, and the PDSCH comprises Downlink Shared Channel (DL-SCH) transmitted from the base station to the UE, and
wherein the transmitter transmits, to the base station, an HARQ response responsive to the detected PDSCH through the first serving cell, the HARQ response being transmitted in a subframe n, wherein n is an integer.

2. The UE of claim 1, wherein an interval between the subframe n−4 and the subframe n is determined by a subframe n−1, a subframe n−2, and a subframe n−3, and
wherein the subframe n−1, the subframe n−2, and the subframe n−3 exist between the subframe n−4 and the subframe n.

3. The UE of claim 1, wherein the transmitter transmits a Physical Uplink Control Channel (PUCCH) that includes the HARQ response.

4. The UE of claim 1, wherein the first serving cell is a primary serving cell (PCell), and the second serving cell is a secondary serving cell (SCell).

5. The UE of claim 1, wherein an uplink/downlink configuration for the second serving cell comprises at least one of uplink/downlink configurations 0, 1, 2, 3, 4, 5, and 6 as shown in the following table:

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a downlink (DL) subframe, U denotes an uplink (UL) subframe, and S denotes a special subframe.

6. The UE of claim 1, wherein the receiver receives, through the second serving cell, a PDCCH that indicates release of Semi-Persistent Scheduling (SPS) transmitted from the base station, the PDCCH that indicates release of SPS being received in a subframe m−4, wherein m−4 is an integer, and
wherein the transmitter transmits, to the base station through the first serving cell, an HARQ response responsive to the received PDCCH that indicates release of SPS, the HARQ response responsive to the received PDCCH that indicates release of SPS being transmitted in a subframe m, wherein m is an integer.

7. The UE of claim 1, wherein the at least one of the PDCCH and the EPDCCH is received in the subframe n−4 in which the PDSCH is received.

8. A base station to receive a Hybrid Automatic Repeat reQuest (HARQ) response, the base station comprising:
a processor to establish a Radio Resource Control (RRC) connection with a User Equipment (UE) through a first serving cell, the first serving cell supporting a Frequency Division Duplex (FDD) mode;
a transmitter to transmit, to the UE, an RRC message through the first serving cell, the RRC message comprising carrier aggregation (CA) configuration information, the CA configuration information comprising information of a second serving cell supporting a Time Division Duplex (TDD) mode, and the first serving cell and the second serving cell being aggregated by an FDD-TDD CA scheme, to transmit, to the UE, at least one of a Physical Downlink Control Channel (PDCCH) and an Enhanced PDCCH (EPDCCH) through the second serving cell, wherein resource allocation information for a Physical Downlink Shared Channel (PDSCH) is included in the at least one of the PDCCH and the EPDCCH, and to transmit, to the UE, the PDSCH through the second serving cell, the PDSCH being transmitted in a subframe n−4, wherein n−4 is an integer, and the PDSCH comprises Downlink Shared Channel (DL-SCH) to be transmitted from the base station to the UE; and
a receiver to receive an HARQ response responsive to the transmitted PDSCH through the first serving cell, the HARQ response being transmitted from the UE and received in a subframe n, wherein n is an integer.

9. The base station of claim 8, wherein an interval between the subframe n−4 and the subframe n is determined by a subframe n−1, a subframe n−2, and a subframe n−3, and
wherein the subframe n−1, the subframe n−2, and the subframe n−3 exist between the subframe n−4 and the subframe n.

10. The base station of claim 8, wherein the receiver receives a Physical Uplink Control Channel (PUCCH) that includes the HARQ response.

11. The base station of claim 8, wherein the first serving cell is a primary serving cell (PCell), and the second serving cell is a secondary serving cell (SCell).

12. The base station of claim 8, wherein an uplink/downlink configuration for the second serving cell comprises at least one of uplink/downlink configurations 0, 1, 2, 3, 4, 5, and 6 as shown in the following table:

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |

-continued

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 4 | D | S | U | U | D | D | D | D | D | D |
| 5 | D | S | U | D | D | D | D | D | D | D |
| 6 | D | S | U | U | U | D | S | U | U | D, | where D denotes a downlink (DL) subframe, U denotes an uplink (UL) subframe, and S denotes a special subframe.

13. The base station of claim 8, wherein the transmitter transmits, to the UE through the second serving cell, a PDCCH that indicates release of Semi-Persistent Scheduling (SPS), the PDCCH that indicates release of SPS being transmitted in a subframe m−4, wherein m−4 is an integer, and wherein the receiver receives, through the first serving cell, an HARQ response responsive to the transmitted PDCCH that indicates release of SPS, the HARQ response responsive to the transmitted PDCCH that indicates release of SPS being received in a subframe m, wherein m is an integer.

14. The base station of claim 8, wherein the at least one of the PDCCH and the EPDCCH is transmitted in the subframe n−4 in which the PDSCH is transmitted.

* * * * *